United States Patent
Lee et al.

(10) Patent No.: US 9,191,421 B2
(45) Date of Patent: *Nov. 17, 2015

(54) METHOD AND AN APPARATUS FOR INITIATING A SESSION IN HOME NETWORK SYSTEM

(71) Applicant: LG Electronics Inc., Seoul (KR)

(72) Inventors: Min Soo Lee, Seoul (KR); Jin Ho Kim, Seoul (KR); Beom Jin Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/560,226

(22) Filed: Dec. 4, 2014

(65) Prior Publication Data

US 2015/0188951 A1   Jul. 2, 2015

Related U.S. Application Data

(63) Continuation of application No. 13/580,309, filed as application No. PCT/KR2011/001223 on Feb. 23, 2011.

(60) Provisional application No. 61/306,961, filed on Feb. 23, 2010, provisional application No. 61/327,730, filed on Apr. 26, 2010.

(51) Int. Cl.
H04L 29/06 (2006.01)
H04L 12/28 (2006.01)
H04W 76/02 (2009.01)

(52) U.S. Cl.
CPC ........ *H04L 65/1069* (2013.01); *H04L 12/2838* (2013.01); *H04W 76/023* (2013.01)

(58) Field of Classification Search
CPC .......... H04L 12/2838; H04L 65/1069; H04W 76/023

USPC ......................................................... 709/228
See application file for complete search history.

(56) References Cited

U.S. PATENT DOCUMENTS

2003/0235168 A1   12/2003   Sharma et al.
2006/0063517 A1   3/2006   Oh et al.
(Continued)

FOREIGN PATENT DOCUMENTS

CN   101039246 A   9/2007
CN   101124792 A   2/2008
KR   20000059429 A   * 10/2000   ............... H04L 12/28

OTHER PUBLICATIONS http://www.hdbaset.org/about, Jan. 12, 2011.
(Continued)

*Primary Examiner* — Kostas Katsikis
(74) *Attorney, Agent, or Firm* — Dentons US LLP

(57) ABSTRACT

Initiating a session over a High Definition Base T (HDBaseT) network. This may involve receiving a message requesting an initiation of a session from an initiation apparatus over an Ethernet network; and transmitting, a response message in response to the request message to the initiation apparatus over the Ethernet network. The request message may include a first source entity reference field for identifying the initiation apparatus and a first destination entity reference field for identifying the session partner, the first source entity reference field includes a Medium Access Control (MAC) address for identifying a management entity contained in the initiation apparatus and a HDBaseT group port identifier (TPG ID) for identifying a port of the initiation apparatus, and the first destination entity reference field includes a Medium Access Control (MAC) address for identifying a management entity contained in the session partner and a HDBaseT group port identifier (TPG ID) for identifying a port of the session partner.

14 Claims, 27 Drawing Sheets

(56) References Cited

U.S. PATENT DOCUMENTS

| | | |
|---|---|---|
| 2006/0291481 A1 | 12/2006 | Kumar |
| 2007/0297390 A1 | 12/2007 | Skog et al. |
| 2010/0180033 A1* | 7/2010 | Abdelal et al. ............... 709/226 |
| 2012/0314720 A1 | 12/2012 | Lee et al. |

OTHER PUBLICATIONS http://www.hdbaset.org/press_releases/view/38, Jun. 29, 2010.
http://www.valens.com/, Dec. 2, 1998.
Valens Semiconductor Announces Availability of World's First HDBase T (TM) Chipset; Market Wire, Dec. 29, 2009., http://www.reuters.com/article/2009/12/29/idUS133368+29-Dec-2009+MW20091229.
Valens Semiconductor's HDBase T Receives HDCP Certification From Intel's DCP LLC, Satellite Spotlight, Mar. 9, 2009., http://www.satellite.tmcnet.com/news/2009/03/09/4040723.htm.
http://www.engadget.com/2008/12/15/valens-hdbaset-tech-carries-hd-video-audio-and-internet-over-et, 2008.

* cited by examiner

METHOD AND AN APPARATUS FOR INITIATING A SESSION IN HOME NETWORK SYSTEM

This application is a Continuation of application Ser. No. 13/580,309 filed on Aug. 21, 2012, which is a 35 U.S.C. §371 National Stage entry of International Application of PCT/KR2011/001223 filed on Feb. 23, 2011, which claims the benefit of U.S. Provisional Application Nos. 61/306,961, filed on Feb. 23, 2010; and 61/327,730, filed on Apr. 26, 2010, all of which are incorporated by reference in their entirety herein.

TECHNICAL FIELD

The present invention relates to a home network system and a home entertainment system, and more particularly to a variety of methods and apparatuses for initiating, forming, managing and terminating a session.

BACKGROUND ART

The present invention relates to a High Definition (HD) Base T technology.

Nowadays, users or customers have to use various kinds of cables so as to use a variety of household appliances (e.g., a television (TV), a computer (PC), an audio device, etc.) for use in home or offices.

Presently, a transfer rate of a general high definition (HD) transmission cable technology has been restricted, and the transfer capacity thereof has also been restricted. Accordingly, the above-mentioned conventional HD transmission cable technology has a disadvantage in that it is unable to process the amount of the rapidly increasing content at high speed. In addition, it is impossible for conventional HD transmission technology to transmit uncompressed video. Thus, although video devices are spaced apart from each other by a distance of several meters, it is difficult to interconnect such video devices, and it is also difficult to provide HD multimedia content to the entirety of a home and/or office.

In addition, existing household appliances include an HD TV cable, an audio cable, a video cable, an Internet LAN line, and a power line separately from one another, such that the entire line arrangement becomes complicated and the beauty of the entire layout is deteriorated.

A representative one from among various cables is a High Definition Multimedia Interface (HDMI) cable. The HDMI cable uses an uncompressed transmission scheme, such that it is not necessary for the HDMI cable to include a decoder or decoding software (S/W) for decompression of compressed video. In addition, the HDMI technology can transmit a video signal, an audio signal and/or a control signal through one cable using a specific format in which the video, audio, and control signals are integrated into one digital interface, such that the existing complicated audio/video (A/V) device line arrangement is simplified.

However, the HDMI technology can provide only a unidirectional service from a multimedia source device to a display device, and maximum cable length is no more than about 15 meters. In addition, it is difficult for the HDMI technology to effectively support an environment supported by a plurality of multimedia sources. For example, the HDMI technology is unable to support a Universal Serial Bus (USB) and a daisy chain scheme such as networking or serial connection, such that usage of the HDMI technology is restricted.

DISCLOSURE OF INVENTION

Technical Problem

Accordingly, the present invention is directed to a method and apparatus for initiating a session in a home network system that substantially obviate one or more problems due to limitations and disadvantages of the related art.

An object of the present invention devised to solve the problem lies on a High Definition (HD) Base T technology for providing 100 Mbps Ethernet and Category 5/6 (CAT 5/6) cable-based 100 Mbps Ethernet so as to transfer uncompressed HD video and audio signals via one cable.

In addition, the HDBaseT technology may be applied to a variety of electronic devices, for example, a home theater system, a digital video recorder (DVR), a BDP (Blu-ray Disc Player), a game machine (e.g. XBOX), a personal computer (PC), and/or a mobile product. If necessary, the electronic devices are connected to a plurality of displays so as to construct multiple screens.

In addition, the HDBaseT technology may also provide bidirectional communication, transmission of several streams, and power transmission of such streams through only one cable.

In order to implement communication between HDBaseT adaptors (each of which will hereinafter be referred to as a T-adaptor) over an HDBaseT network, a session must be formed. The session defines a communication network path and carries out an appropriate service using the defined communication network path.

However, the existing published technologies have not yet disclosed how to create, manage, maintain, and release a session using the HDBaseT network.

An object of the present invention is to provide a method and apparatus for effectively performing communication between entities over an HDBaseT network.

Another object of the present invention is to provide a method for creating a session over an HDBaseT network.

Another object of the present invention is to provide a method for managing a session over an HDBaseT network.

Another object of the present invention is to provide a method for releasing and/or terminating a session over an HDBaseT network.

A further object of the present invention is to provide an apparatus for forming, managing, releasing, and terminating a session over an HDBaseT network.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Solution to Problem

The present invention relates to a home network system and a home entertainment system, and discloses a variety of methods and apparatuses for initiating, forming, managing, and terminating a session.

The object of the present invention can be achieved by providing a method for initiating a session over a HDBaseT network including: transmitting, by an initiation entity, a session initiation request message for initiating the session to at least one session partner selected by the initiation entity over an Ethernet network; and receiving a session initiation response message acting as a response to the session initiation request message from the at least one session partner over the Ethernet network. The session initiation request message includes a first source reference field for identifying the initiation entity and a second final target reference (FTR) field for identifying the at least one session partner.

In another aspect of the present invention, an initiation entity for initiating a session over a High Definition Base T (HDBaseT) network includes: a transmission (Tx) module for transmitting a message; a reception (Rx) module for receiving a message; and a Control Point Management Entity (CPME). The initiation entity transmits a session initiation request message for initiating the session to at least one session partner selected by the initiation entity using the transmission (Tx) module over an Ethernet network, and receives a session initiation response message acting as a response to the session initiation request message from the at least one session partner over the Ethernet network, and the session initiation request message includes a first source reference field for identifying the initiation entity and a second final target reference (FTR) field for identifying the at least one session partner.

The first source reference field may include a Medium Access Control (MAC) address for identifying a management entity contained in the initiation entity and a HDBaseT Group port identifier (TPG ID) for identifying a port of the initiation entity. The second final target reference (FTR) field may include a Medium Access Control (MAC) address for identifying a management entity contained in the session partner and a group port identifier (TPG ID) for identifying a port of the session partner.

The session initiation response message may include a second final target reference (FTR) field for identifying the initiation entity and a second source reference field for identifying the at least one session partner.

The second source reference field may include a Medium Access Control (MAC) address for identifying a management entity contained in the at least one session partner and a group port identifier (TPG ID) for identifying a port of the at least one session partner. The second final target reference (FTR) field may include a Medium Access Control (MAC) address for identifying a management entity contained in the initiation entity and a group port identifier (TPG ID) for identifying a port of the initiation entity.

The session initiation request message may include a source identifier (ID) field, a source T-group ID field, a source T-adaptor mask field, a sink ID field, a sink T-group ID field, and a sink T-adaptor mask field. The source ID field, the source T-group ID field, and the source T-adaptor mask field may be indicative of a T-adaptor of a current session partner. The sink ID field, the sink T-group ID field, and the sink T-adaptor mask field may be indicative of a T-adaptor of a T-adaptor of another session partner.

The at least one session partner may include a source device for providing content through the session and a sink device for receiving the content through the session.

The session initiation request message and the session initiation response message may be transmitted using a HDBaseT Control and Management Protocol (HD-CMP) message format.

The initiation entity may be a mobile station (MS) including a control point (CP), and the at lease one session partner may be a source device for providing content.

Those skilled in the art will appreciate that the exemplary embodiments of the present invention are merely part of preferred embodiments of the present invention and various embodiments of the present invention reflecting the technical features of the present invention can be derived and understood from the following detailed description of the present invention.

Advantageous Effects of Invention

Exemplary embodiments of the present invention have the following effects. Methods and apparatuses according to the present invention can provide effects superior to those of the conventional home network system.

First, the methods and apparatuses according to embodiments of the present invention can enable several entities to effectively communicate with each other over an HDBaseT network.

Second, the methods and apparatuses according to embodiments of the present invention can enable each HDBaseT device to accurately and efficiently initiate and form the session in an HDBaseT network.

Third, the methods and apparatuses according to embodiments of the present invention can efficiently manage a session in an HDBaseT network.

Fourth, the methods and apparatuses according to embodiments of the present invention provide a method for releasing and/or terminating the session formed in an HDBaseT network.

It will be appreciated by persons skilled in the art that that the effects that can be achieved through the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Figure 1:
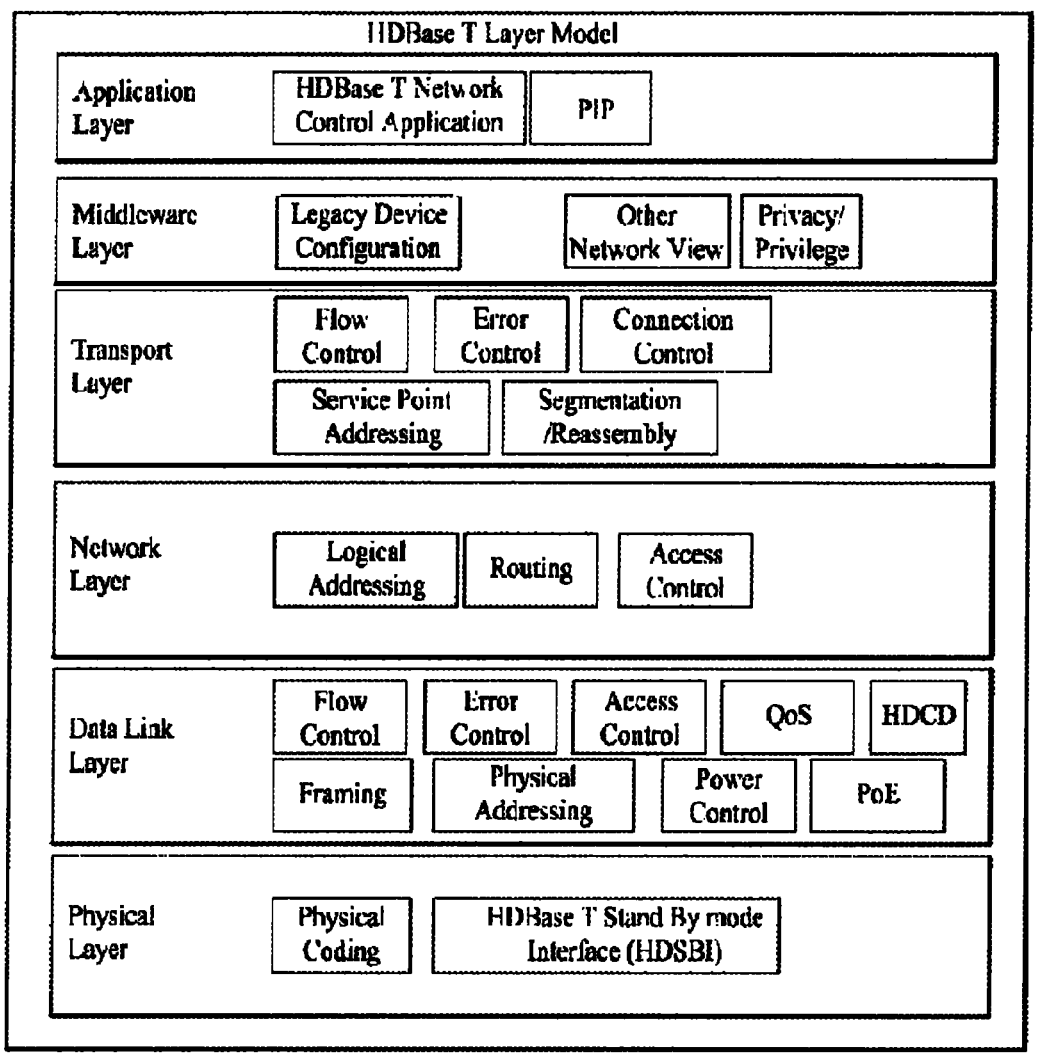
FIG. 1 is a conceptual diagram illustrating an example of a hierarchical structure model of an HDBaseT network applicable to embodiments of the present invention.

Reference will now be made in detail to the preferred embodiments of the present invention, examples of which are illustrated in the accompanying drawings. Wherever possible, the same reference numbers will be used throughout the drawings to refer to the same or like parts. Exemplary embodiments of the present invention relate to a home network system and a home entertainment system, and also provide a variety of methods and apparatuses for initiating, forming, managing, and terminating a session in an HDBaseT system.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description, drawings, procedures or steps, which may obscure the substance of the present invention, are not explained. Additionally, procedures or steps, which can be understood by those skilled in the art, are not explained.

In exemplary embodiments of the present invention, a description is given of a data transmission and reception relationship between a transmission adaptor and a reception adaptor.

In exemplary embodiments of the present invention, the term 'downlink stream (DS)' refers to the flow of logical data or a stream transferred from one device providing content to another device receiving content. In some cases, the term 'downlink stream (DS)' may have the same meaning as the term 'downlink'. In addition, the term 'uplink stream (US)' refers to the flow of logical data or a stream conceptually opposed to the term 'downlink stream (DS)', and may have the same meaning as the term 'uplink'.

In addition, the term 'source device' may be any of content providing devices, for example, a Blu-ray Disc Player (BDP), a Digital Video Recorder (DVR), a computer, an X-box (XBOX), a laptop, etc. The term 'sink device' may be any of a home theater and a television (e.g., any one of a TV, a monitor, and various displays).

Exemplary embodiments of the present invention are supported by HDBase T standard documents (especially, HDBase T Specification Draft Version 1.0 and/or version 1.4). In particular, steps or parts, description of which is omitted herein so as not to obscure the technical idea of the present invention, may be supported by the above documents. All terminology used herein may be supported by the above-mentioned HDBase T standard documents.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Specific terms used for the exemplary embodiments of the present invention are provided to aid in understanding of the present invention. These specific terms may be replaced with other terms within the scope and spirit of the present invention.

I. HDBaseT Network

The HDBaseT network aims to provide realtime data streams (e.g. an HDMI 1.4 stream, a Sony/Philips Digital Interconnect Format (S/PDIF) stream, and a Universal Serial Bus (USB) stream), a parallel network of Ethernet data, home cable configuration, and high-specification networking.

In addition, the HDBaseT network supports an existing device/interface (i.e. legacy device) such as HDMI, Ethernet, USB, and S/PDIF. S/PDIF is a standard for transmitting a digital audio signal and conceptually originated in AES/EBU. The HDBaseT network is designed to support core network services to be developed in the future.

HDBaseT link operates to support four Unshielded Twisted Pair (UTP)/Shielded Twist Pair (STP) CAT5e/6/6a cables including 100 m, Peer-to-Peer (PTP), and two middle RJ45 connectors.

Downstream sublink may support 8 Gbps, 500M symbols/sec. and PAM 16 symbols. Uplink sublink may support 300 Mbps, 25M symbols/sec., and PAM 16 symbol. In addition, the downlink sublink and the uplink sublink may support bidirectional universal 200 Mbps among USB 1.0/2.0, S/PDIF, Infrared (IR) and Universal Asynchronous Receiver/Transmitter (UART), and may also support bidirectional 100 Mbps Ethernet.

HDBaseT may simultaneously support multiple streams (multistreams) on a single link, and may support at least 8 HDMI 1.4 downstreams, 12 USB or S/PDIF bidirectional streams, 8 IRs, and 8 UART bidirectional streams.

FIG. 1 is a conceptual diagram illustrating an example of a hierarchical structure model of an HDBaseT network applicable to embodiments of the present invention.

The HDBaseT network is based on an Open System Interconnection (OSI) reference model. However, the embodiments of the present invention are applied to a HDBase T technology. As can be seen from FIG. 1, the HDBase T technology is connected to the basic OSI reference model so as to provide a new network hierarchy.

Referring to FIG. 1, the HDBaseT network includes a physical layer L1 acting as a first layer, a data link layer L2 acting as a second layer, a network layer acting as a third layer, a transport layer acting as a fourth layer, a middleware layer acting as a fifth layer, and an application layer acting as a sixth layer.

In this case, a variety of functions may be provided from the first layer, for example, a physical coding function for transmitting a T-stream, an HDBaseT Stand By mode Interface (HDSBI) function, etc.

A variety of functions may be provided from the second layer, for example, a flow control function, an error control function, an access control function, a Quality of Service (QoS) function, an HDBaseT Configuration Database (HDCD) function for providing configuration information of an HDBaseT device, a framing function, a physical addressing function, a power control function, a Power over Ethernet (PoE) function through Ethernet, and the like.

The third layer provides a logical addressing function, a muting function for optimally transmitting data, and an access control function, etc.

The fourth layer provides a flow control function to control a service flow, an error control function, a connection control function, a service point addressing function, and a segmentation/reassembly function to segment/reassemble upper data.

The fifth layer provides a legacy device configuration function for providing information regarding a legacy device so as to support the legacy device, an Other Network View (ONV) function for communicating with another network, and a privacy/privilege function for deciding not only a privacy for data protection but also data privileges.

The sixth layer may provide not only an HDBaseT Network Control Application function to control communication over the HDBaseT network, but also a function for displaying multiple video streams using a Picture in Picture (PIP) scheme.

HDBaseT devices for use in the embodiments of the present invention can transmit and receive data and streams on the basis of a hierarchical model structure of FIG. 1.

II. HDBaseT Adaptor (T-Adaptor)

The HDBaseT adaptor (hereinafter referred to as T-adaptor) converts different kinds of protocol/interface/application data types into an HDBaseT data format. The T-adaptor uses a T-network (i.e., network for use in HDBaseT) service so as to communicate with another T-adaptor. The target T-adaptor may allow the converted stream (hereinafter referred to as a T-stream) of the HDBaseT system to be returned to an original format.

Figure 2:
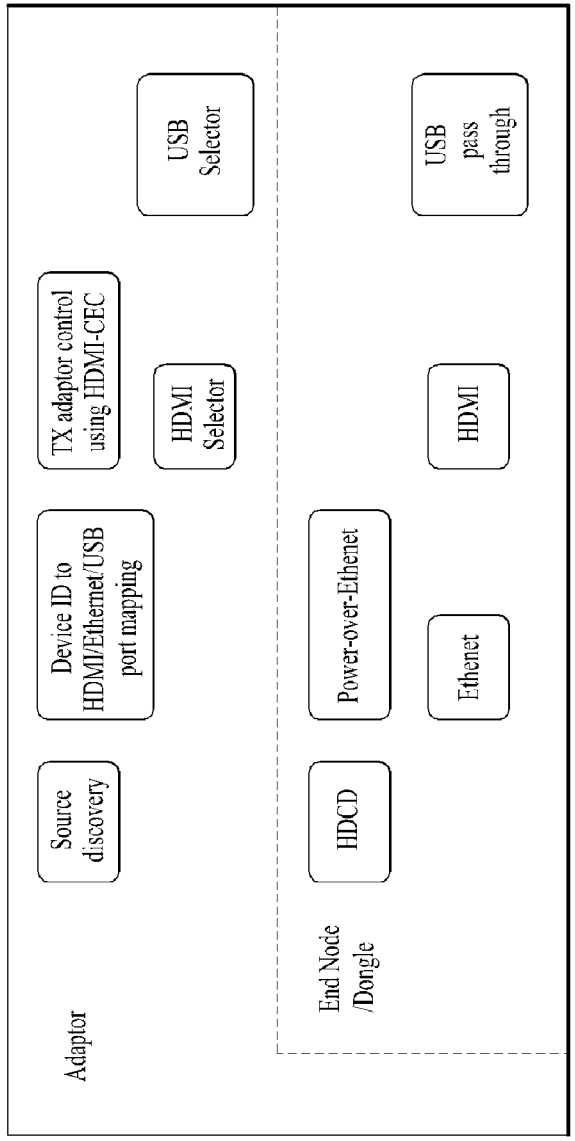
FIG. 2 is a conceptual diagram illustrating a structure and function of an HDBaseT adaptor for use in the embodiments of the present invention.

FIG. 2 is a conceptual diagram illustrating a structure and function of an HDBaseT adaptor for use in the embodiments of the present invention.

Referring to FIG. 2, the T-adaptor for use in the HDBaseT system may include an end node (e.g., at least one of a dongle, an HDMI selector, and a USB selector).

Referring to FIG. 2, the T-adaptor includes end nodes (e.g., dongles). The T-adaptor includes a source discovery function, a 'Device ID to HDMI/Ethernet/USB ports mapping' function, a 'Tx adaptor control using HDMI-CEC' function, an HDMI selector function, a USB selector, etc. In addition, the end node contained in the T-adaptor may support an HDBaseT Configuration Database (HDCD), a 'Power over Ethernet' function, an Ethernet port, an HDMI port, and USB (1.0/2.0/4.0) ports.

The T-adaptor may include one or more HDMI input ports. The T-adaptor may provide HDMI data received from one source device to a sink device connected to a different T-adaptor (i.e., a reception (Rx) adaptor) using the HDMI switching technology. In this case, the HDMI selector may select one or more HDMI input ports under the control of an HDMI-Consumer Electronics Control (HDMI-CEC) designated by the user. In brief, the above-mentioned operation may be referred to as HDMI selection.

In addition, the T-adaptor may include one or more USB input ports. The T-adaptor may select any one of the USB ports according to a user request message. This USB port selection operation may be carried out by a USB selector contained in the T-adaptor.

The single stream T-adaptor supports Peer-to-Peer (PTP) connection to a different adaptor on the HDBaseT network. The T-adaptor supports the same legacy networks such as Ethernet, USB, or CEC, and allows a Control Point (CP) to use a legacy network and control an HDMI switch.

The T-adaptor for use in the HDBaseT system includes a variety of principal functions, for example, an HDMI switching function, a source discovery function to search for a source device connected to an HDMI port and/or a USB port of the T-adaptor, a port mapping function to search for a USB port according to HDMI port selection.

The source discovery function is indicative of a specific function for recognizing what the actual source device attached to a port of the T-adaptor is. The T-adaptor does not recognize what the name of the actual device attached to an HDMI port, an Ethernet port, and a USB port is. The device name is set by the user. In order to obtain the actual device name from an HDBaseT Configuration Database device entity and then establish the actual device name, the T-adaptor may use processes (e.g., HLIC Get Transaction/HLIC Set Transaction) for obtaining/establishing 'HDBaseT Link Internal Controls' (HLIC) including a Device Description String (DDS).

The port mapping function is indicative of a function for mapping a Device Identifier (DID) to an HDMI port, an Ethernet port, and a USB port. The T-adaptor may select HDMI/Ethernet/USB ports as a group of ports in response to source device identifier selection. A USB hub may be contained in an Rx T-adaptor attached to the USB port.

Figure 3:
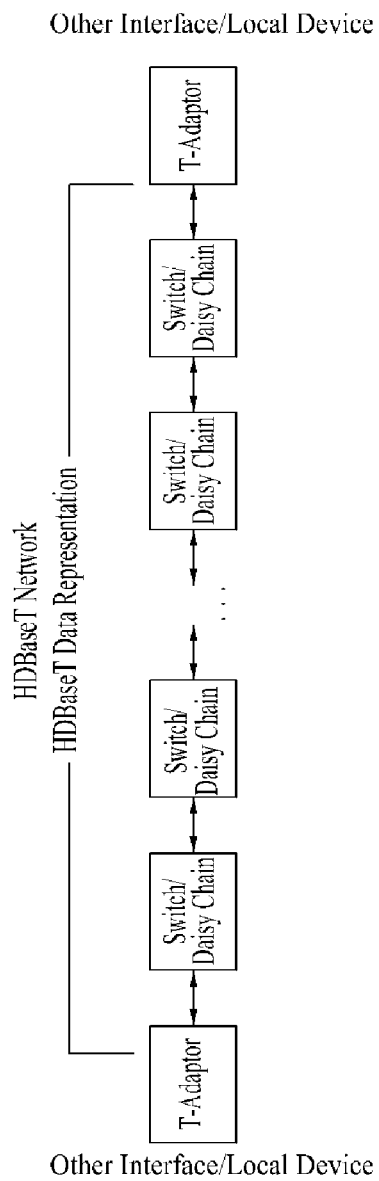
FIG. 3 is a conceptual diagram illustrating an exemplary HDBase T network (i.e. a T network) for use in the embodiments of the present invention.

FIG. 3 is a conceptual diagram illustrating an exemplary HDBase T network (i.e., a T network) for use in the embodiments of the present invention.

Referring to FIG. 3, the HDBaseT network (hereinafter referred to as a T network) can provide predictable and stable services and high efficiency and low latency services so as to support Ethernet services and realtime communication streams. The T-adaptor can provide an appropriate HDBaseT service through a connection group of a switch device and a daisy chain device supporting serial connection. For example, the T-adaptor may select an appropriate T-service through the switch device and the daisy chain device in response to requirements of native protocols/interfaces/applications. In this case, the switch device and the daisy chain device need not recognize the T-adaptor type and the message processing method.

The T-network is indicative of a specific area in which an HDBaseT stream converted by the T-adaptor is transmitted. The T-network indicates a communication area from the source T-adaptor to the sink T-adaptor. The T-adaptor may be used as a Tx adaptor on downstream (DS), and may be used as an Rx adaptor on upstream (US). In this case, the Tx adaptor may be used in the same manner as the source adaptor, and the Rx adaptor may also be used in the same manner as the sink adaptor. That is, one T-adaptor may perform the Tx adaptor function and the Rx adaptor function according to a stream transmission format.

The HDBaseT-stream (hereinafter referred to as T-stream) is an aggregate of HDBaseT packet streams corresponding to information contained in one native session. All packets contained in one T-stream include the same Session IDentifiers (SIDs) tokens. The T-stream may optionally include different types of packets.

III. Method for Identifying HDBaseT Entity

The above-mentioned description has disclosed various HDBaseT devices and entities for use in the HDBaseT network. However, when transmitting the T-stream over the T-network, the above-mentioned description does not concretely disclose a method for transmitting the T-stream through devices, entities, and ports. In addition, although the T-stream is transmitted to the same devices, the above-mentioned description does not disclose a method for classifying corresponding data and services according to provided data and/or services. Accordingly, a method for referring and identifying HDBaseT entities on the HDBaseT network will hereinafter be described below with reference to the accompanying drawings.

Figure 4:
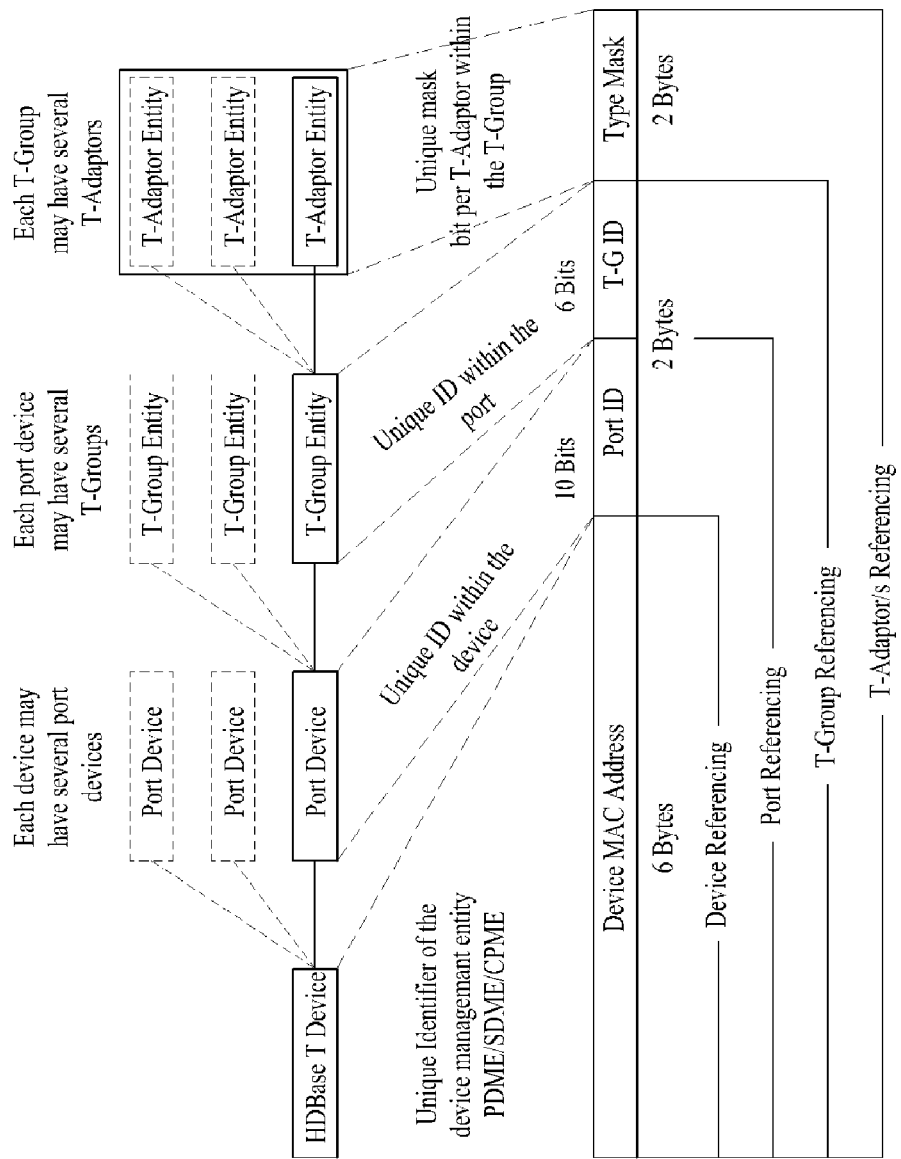
FIG. 4 is a conceptual diagram illustrating a 4-level hierarchical reference method and identifier (ID) structure so as to identify an HDBaseT entity according to an embodiment of the present invention.

FIG. 4 is a conceptual diagram illustrating a 4-level hierarchical reference method and identifier (ID) structure for identification of an HDBaseT entity according to an embodiment of the present invention.

Referring to FIG. 4, one HDBaseT device may include one or more port devices. Each port device may include one or more T-groups. In addition, each T-group may include one or more T-adaptors.

The 4-level hierarchical reference method for identifying various HDBaseT network entities will hereinafter be described with reference to the accompanying drawings.

The 4-level hierarchical reference method can be carried out using a variety of parameters, for example, a device MAC address for identifying management entities (i.e. PDME, SDME, CPME) contained in the HDBaseT device, a port ID for identifying each port, a T-G ID for identifying each T-group, and a type mask serving as a unique mask identifying each T-adaptor.

The embodiments of the present invention use a device ID to identify the HDBaseT device. In this case, the embodiments of the present invention may use an Ethernet MAC address as a device ID, and may be referred to as a device MAC address. The device MAC address is a unique ID for identifying management entities contained in the corresponding HDBaseT device.

It is preferable that PDME, SDME and CPME support Ethernet termination. If PDME is used for Ethernet termination, the Ethernet MAC address may be used as a unique ID. However, if PDME is not used for Ethernet termination, PDME preferably communicates with SDME serving as a link partner using the HLIC process. In addition, PDME may obtain the device ID of the SDME, such that it can use the SDME ID. In addition, PDME may use an SDME MAC address as a PDME device ID, and may also use a port index of the SDME as a PDME port index. The SDME serving as a link partner has to transmit all the management processing steps to the PDME. If the link partner is not used as a switch acting as a peer-to-peer (PTP) direct point, it is impossible for the PDME to include a unique ID.

Port Referencing (Device ID:Port ID) needs to be carried out to uniquely identify PDME. In accordance with the embodiments of the present invention, a link (linkage) between the T-network and the E-network may be formed using the Ethernet MAC address as a device ID, and the T-network and sessions can be managed using Ethernet communication.

Referring to FIG. 4, it can be recognized that the port ID field is used to identify the port device and the T-G ID field is used to identify the T-group. In this case, the port ID field and the T-G ID field may be used simultaneously, and may be composed of a total of 2 bytes. In more detail, the port ID field is assigned 10 bits and the T-G group field is assigned 6 bits. In this case, the port ID and the T-G ID may be referred to as a TPG ID (or a Group Port ID) as necessary.

2 bytes of the TPG ID field may carry an index of 10 bits of the port device and a T-group index of 6 bits of the port device. The port index of the remaining values '1~1023' other than '0' provides unique referencing of the port device contained in the HDBaseT device. In addition, the T-group index of the remaining values other than '0' of 1 to 63 bits provides unique referencing of a specific T-group contained in the port device.

If the T-group index is set to '0' in the TPG ID, the TPG ID provides unique referencing for the port contained in the HDBaseT, and may be referred to as a port ID. If the port ID is set to '0', the TPG ID does not provide any other meaningful value.

Referring to FIG. 4, it can be recognized that the type mask field is adapted to identify the T-adaptor. Each T-group may include the T-adaptor type mask field indicating the type of the T-adaptor related to the corresponding group. The basic type mask field is 16 bits long (MSB=b15 and LSB=b0), and each bit indicates a specific type of the T-adaptor related to the corresponding T-group.

The following Table 1 shows an exemplary bit index of the type mask field corresponding to the T-adaptor type.

TABLE 1

| Bit Index | T-adaptor Type |
|---|---|
| 0 | HDMI Source |
| 1 | HDMI Sink |

TABLE 1-continued

| Bit Index | T-adaptor Type |
|---|---|
| 2 | Reserved |
| 3 | Reserved |
| 4 | USB Host |
| 5 | USB Device/Hub |
| 6 | Reserved |
| 7 | Reserved |
| 8 | S/PDIF Source |
| 9 | S/PDIF Sink |
| 10 | Reserved |
| 11 | Reserved |
| 12 | IR TX |
| 13 | IR RX |
| 14 | UART |
| 15 | Extension Bit |

Referring to Table 1, the bit indexes 0 and 1 indicate an HDMI source device and the sink device, respectively. The bit indexes 4 and 5 indicate a USB host and a USB device/hub, respectively. The bit indexes 8 and 9 indicate S/PDIF source and S/PDIF sink, respectively. In addition, the bit indexes 12 and 13 indicate an infrared (IR) transmitter (Tx) and an infrared (IR) receiver (Rx), respectively. The bit index 14 indicates a Universal Asynchronous Receiver/Transmitter.

If the bit index 15 (b15) is established, this bit index 15 (b15) indicates that the additional extension field of 16 bits is used to indicate the T-adaptor type. The HDBaseT device does not consider that the index 15 is always set to '0'. In addition, the HDBaseT device can support a maximum of three extension fields. For example, the HDBaseT device can support the type mask field having a maximum of 64 bits.

It is impossible for each T-group to relate to a plurality of instances of a specific T-adaptor type. Therefore, the type mask field can uniquely identify a specific T-adaptor instance in the T-group. In addition, the type mask field may refer to one or more T-adaptor instances from among the T-adaptor group related to the T-group using the type mask reference.

FIG. 4 shows a hierarchical reference method for identifying the T-adaptor using 10 bytes. In other words, in the case where the T-stream is transmitted from the source T-adaptor to the sink T-adaptor, the hierarchical referencing method shown in FIG. 4 can transmit a message (or stream) including the source T-adaptor ID of 10 bytes and the sink T-adaptor ID of 10 bytes.

In addition, when signals or messages are transmitted and received within a specific HDBaseT device, the signals or messages may be added or deducted in each field as necessary. For example, the HDBaseT Control and Management Protocol (HD-CMP) message for use in communication between PDME of the HDBaseT end node and SDME of the HDBaseT switch may use a source ID of 8 bytes (e.g. device ID (6 bytes)+TPG ID (2 bytes)) and a sink ID of 8 bytes.

In the embodiments of the present invention, the type mask field is adapted to identify an interface of a port. For example, if HDMI, IR and USB are contained in one T-group port ID, the type mask is used to identify each interface. In addition, the type mask is also used even when a specific interface is indicated in a T-group port ID when forming a session. For example, when forming a session between two ports using the HD-CMP messages, source and sink devices are specified in the HD-CMP messages. In this case, the type mask may also be used.

IV. Method for Initiating, Forming, Managing, and Terminating Session

1. Method for Forming Session

A session must be formed to allow the T-adaptor to communicate with another T-adaptor over the T-network. A session defines bidirectional communication and a path of a communication network, and is going to perform an appropriate service contained in the defined result. Each active session is identified by an SID token (i.e., a session ID or a stream ID) accompanying each HDBaseT stream. Switches contained in the network path switch packets according to SID tokens. The use of SID tokens may minimize packet address overhead because small-sized packets are used in the HDBaseT.

Each activation session is classified by a session ID (SID) token of 8 bits having 1 to 255 valid values. SID is contained in the HDBaseT packets contained in the corresponding session. T-switches contained in the above-mentioned sub-network path switch packets according to the SID token. If other sessions do not include a common switch device passing a route of the sessions, each switch on each path has a unique ID, and different sessions sharing the same SID can be simultaneously activated.

Figure 5:
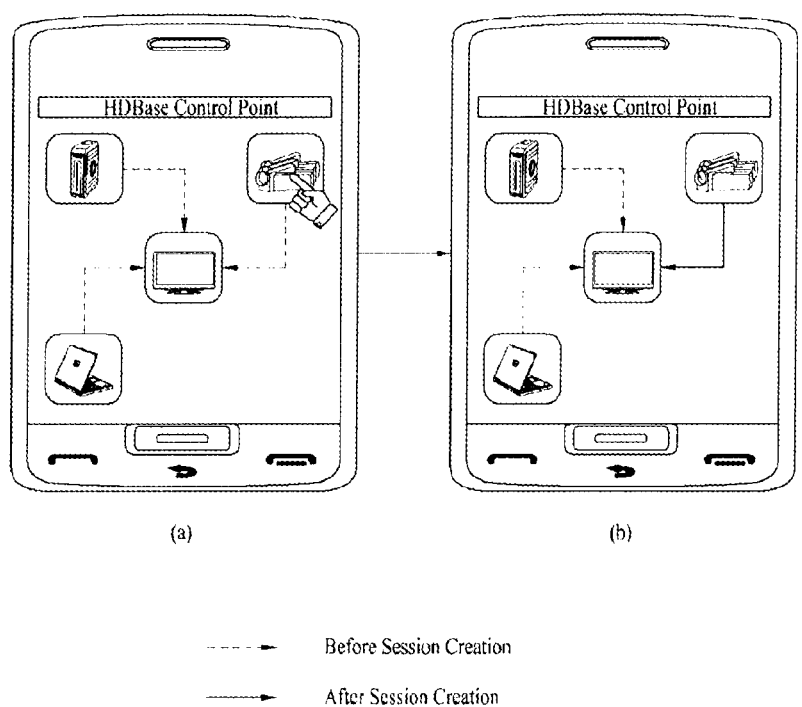
FIG. 5 is a conceptual diagram illustrating a method for forming a session according to one embodiment of the present invention.

FIG. 5 is a conceptual diagram illustrating a method for forming a session according to one embodiment of the present invention.

Referring to FIG. 5, session initiation indicates that a communication network path of a session is configured and established to exchange HDBaseT data. In addition, session termination indicates that a communication network path is released to stop the exchange of data.

In the embodiments of the present invention, the HDBaseT control point (CP) can form a session by controlling one or more source devices and one or more sink devices. Referring to FIG. 5(a), the control point (CP) operates as a source device and prepares a session for an X-box, a camcorder, and a laptop. If the user selects a camcorder as a source device as shown in FIG. 5(a), the camcorder forms a session with a living room TV acting a sink device (See FIG. 5(b). The user who stays in a living room can watch a moving image stored in a camcorder through the formed session.

The embodiments of the present invention provide control messages used for supporting the session creating method. In addition, the embodiments of the present invention also provide control messages to control session management and session termination.

2. Session Control Message

The embodiments of the present invention provide a variety of session control messages so as to initiate, maintain, manage, and terminate a session. For example, in order to initiate a session, session initiation request/response messages are used to initiate the session. In order to terminate the session, the session release request/response messages or the session termination request/response messages are used. In order to establish the session route, session route request/response messages are used. In addition, the embodiments of the present invention provide session status request/response messages to discover a specific session in which the HDBaseT devices (e.g. CP) is activated.

Figure 6:
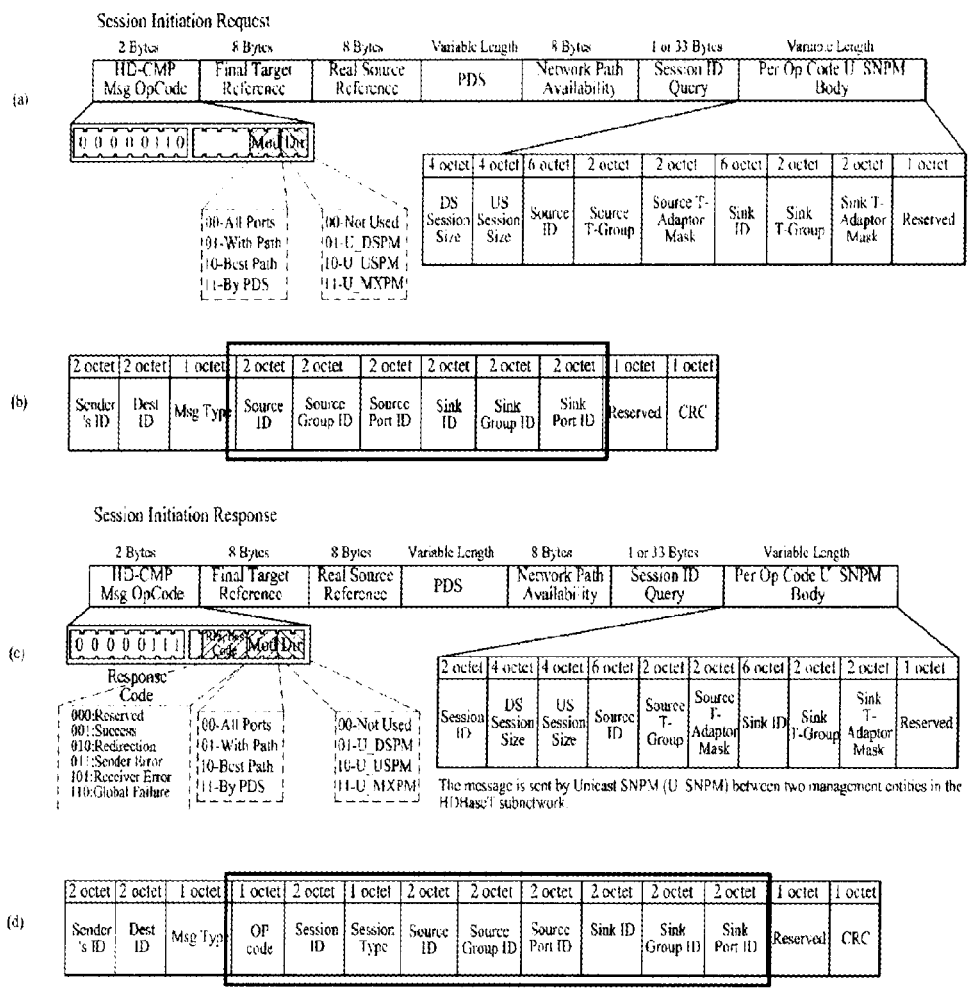
FIG. 6 is a structural view illustrating a session initiation request message and a session initiation response message according to one embodiment of the present invention.

FIG. 6 is a structural view illustrating a session initiation request message and a session initiation response message according to one embodiment of the present invention.

The session initiation request message is transmitted to session partners (e.g. first partner and second partner) operating as a management entity in the initiation entity initiating a session, such that the possibility of session initiation of the session partners and the session requirements can be confirmed. In this case, the session initiation request message can be transmitted over Ethernet (e.g., E-network) using the HD-CMP message.

The session partners transmit the session initiation response message as a response to the session initiation request message. Therefore, the session initiation response message may also be transmitted over Ethernet using the HD-CMP message. In addition, the session initiation request message and the session initiation response message can be transmitted and received between two management entities over the HDBaseT sub-network through a Unicast SNPM (U-SNPM) message.

FIG. 6(a) shows an example of the session initiation request message. Referring to FIG. 6(a), the session initiation request message may include an HD-CMP Message (Msg) Operation (Op) Code field, a Final Target Reference (FTR) field, a Real Source Reference (RSR) field, a Path Description Section (PDS) field, a network path availability (NPA) field indicating an available network path, a Session ID Query (SIQ) field, a 'Per Op Code U_SNPM body' field acting as an HD-CMP payload.

In FIG. 6(a), the 'HD-CMP Msg OpCode' field may include a 'Mod' field that indicates whether the session initiation request message is transmitted to a different device and a 'Dir' field that indicates directivity for transmission of the session initiation request message.

In the embodiments of the present invention, the Mod field is 2 bits long, transmits a message to all ports connected to the corresponding device (See '00' part), transmits a message to designated ports so as to transmit information through a muting path known in the device (See '01' part), transmits a message to a designated port so as to transmit information through a single optimum routing path (See '10' part), and transmits a message through a path defined by a PDS field (See '11' part). In addition, the Dir field indicates a transmission direction of the message. In more detail, the Dir field may indicate a downstream (DS) 01, an upstream (US) 10, or a mixed path 11 as shown in FIG. 6(a).

The Final Target Reference (FTR) field is used to identify a session partner (e.g., a management entity of the final destination) where the session initiation request message is to be transmitted, and the Real Source Reference (RSR) field is used to identify an initiation entity for transmitting a session initiation request message. For example, the final target reference (FTR) field is 8 bytes long, and may include a MAC address for identifying a management entity of the session partner and a TPG (HDBaseT Group Port) identifier for identifying the port device of the session partner. The real source reference (RSR) field is 8 bytes long, and may include a MAC address of the management entity contained in the initiation entity and a TPG identifier for identifying a port device of the initiation entity.

As can be seen from FIG. 6(a) and messages to be described below, the FTR field may be referred to as a Final Destination Entity Reference (FDER) field, and the real source reference (RSR) field may be referred to as a Real Source Entity Reference (RSER) field.

The PDS field is contained in a payload of the HD-CMP message, and includes information about PDS entities indicating an input port of the device and an output port of the device. The network path availability (NPA) field is contained in the payload of the HD-CMP message, and indicates the amount of processable data and the number of accumulated packet streams. The SIQ field is adapted to search for an active session identifier or a pre-allocated session identifier in a network path.

Referring to FIG. 6(a), the 'Per Op Code U_SNPM body' field acting as an HD-CMP payload may include a downstream (DS) session size field indicating a downstream (DS) session size; an upstream (US) session size field indicating an upstream (US) session size; a source ID field indicating an ID of a source device selected by a control point (CP); a source T-group field indicating a T-group and a port device of a source when a corresponding session is coupled to other sessions; a source T-adaptor mask field indicating a T-adaptor mask of a T-group of a source device; a sink ID field indicating an ID of a sink device selected by a control point (CP); a sink T-group field indicating a T-group and a port device of a sink device when a corresponding session is coupled to other sessions; and a sink T-adaptor mask field indicating a T-adaptor mask of a T-group of a sink device.

In this case, in several fields contained in the 'Per Op Code U_SNPM body' field, a source device indicates a device for providing content, and a sink device indicates a device for receiving content. If a session of the source device is coupled to a session of the sink device, each of the source T-group ID field and the sink T-group ID field is set to any value other than '0'. However, if the source device supports coupling between sessions and a source group token number is not set to '0', the source T-adaptor mask field is set to null. If the source device supports session coupling and the sink T-group is not set to '0', the sink T-adaptor mask field is set to null. In this case, if each of the source T-group ID and the sink T-group ID is not set to '0' and each of the source T-adaptor mask field and the sink T-adaptor mask field is set to any value other than '0', a session may be initiated.

In other words, the source ID field, the source T-group field, and the source T-adaptor field may be used as a his Partner TI-adaptor Reference (TPTR) field. In addition, the sink ID field, the sink T-group field, and the sink T-adaptor field may be used as an Other Partner T-adaptor Reference (OPTR) field indicating a T-adaptor of another session partner.

FIG. 6(b) shows another example of a session initiation request message structure. Referring to FIG. 6(b), the session initiation request message may include a Sender ID field fir indicating an identifier (ID) of a control point (CP) device (i.e. an initiation entity) that transmits a session initiation request message; a Destination ID field for indicating a management entity acting as a session partner of a destination to which the session initiation request message will be transmitted; and a Message Type field indicating a type of the corresponding message.

In this case, the sender ID may be used to identify an initiation entity that transmits a session initiation request message. The destination ID may be used to inform a management entity acting as a session partner of a destination to which the session initiation request message is transmitted.

The session initiation request message may include a source ID field for indicating a source device selected by a control point (CP); a Source Group ID for indicating a group port number of a source when a current session is coupled to another session; a Source Port ID field for identifying a session source port of a source device; a Sink ID field for identifying a sink device selected by a control point (CP); a Sink Group ID field for indicating a group port number of a sink when a current session is coupled to another session; and a Sink Port ID field for identifying a session sink port of a sink device.

In FIG. 6(b), the source group ID field may be set to any value other than '0' when the source device supports session coupling. If the source device supports session coupling and the source group ID field is not set to '0', the source port ID field may be set to null. In addition, if the sink device supports session coupling, the sink group ID field may be set to any value other than '0'. If the sink device supports session coupling and the sink group ID is not set to '0', the sink port ID field may be set to null. In this case, if each of the source group ID and the sink group ID is not set to '0' and each of the source port ID and the sink port ID is not set to '0', a session may be initiated.

In other words, the source ID field, the source group field and the source port field may be used as a This Partner T-adaptor Reference (TPTR) field. In addition, the sink ID field, the sink group field, and the sink port field may be used as an Other Partner T-adaptor Reference (OPTR) field indicating a T-adaptor of another session partner.

FIG. 6(c) shows an example of a session initiation response message structure. Referring to FIG. 6(c), the session initiation response message may include an HD-CMP Msg OpCode field, a Final Target Reference field, a Real Source Reference field, a Path Description Selection (PDS) field, a Network Path Availability (NPA) field indicating an available network path, a Session ID Query (SIQ) field, and a 'Per Op Code U_SNPM body' field acting as an HD-CMP payload.

Although the HD-CMP Msg OpCode field shown in FIG. 6(c) has the same structure as the HD-CMP Msg OpCode field shown in FIG. 6(a), the HD-CMP Msg OpCode field of FIG. 6(c) further includes a response code field. The response code field is 3 bits long, may indicate success of a session initiation request, may indicate a Redirection status in which another device has attempted to send a request, may indicate a Sender Error status in which a request is not completed because of an error encountered in the request and a request may be reattempted when the error is corrected, may indicate a Receiver Error status in which a request is not completed because of an error of a recipient and the request may be reattempted to another device, and may indicate a Global Failure status in which a session initiation request fails and is not re-attempted.

In FIG. 6(c), the final target reference (FTR) field may be used to identify an initiation entity that has transmitted a session initiation request message, and the real source reference (RSR) field may be used to identify a session partner management entity that transmits a session initiation response message. In this case, the final target reference (FTR) field may include a MAC address for identifying a management entity contained in an initiation entity and a TPG identifier for identifying a port device of the initiation entity. In addition, the Real Source Reference (RSR) field may include a MAC address for identifying a management entity of a session partner and a TPG identifier (ID) for identifying a port device of the session partner.

The PDS field, the NPA field, and the SIQ field may carry out the same functions as those of the PDS, NPA and SIQ fields contained in the session initiation request message.

The 'Per Op Code U_SNPM Body' field of the session initiation response message may include a Session ID field for uniquely identifying a session initiated by a source device; a DS Session Size field indicating the size of downstream data of a session indicated by the NPA field; and an upstream (US) Session Size field for indicating the size of US data of a session indicated by the NPA field.

In this case, the 'Per Op Code U_SNPM Body' field may further include a Source ID field indicating an ID of a source device selected by a control point (CP); a source T-group field indicating a T-group ID of a source when the corresponding session is coupled to another session; and a source T-adaptor mask field indicating a T-adaptor mask of a T-group of a source device.

In addition, the 'Per Op Code U_SNPM Body' field may further include a Sink ID field indicating an ID of a sink device selected by a control point (CP); a Sink T-Group field indicating a T-group of a sink when a current session is coupled to other sessions; and a Sink T-adaptor mask field indicating a T-adaptor mask of a T-group of a sink device.

In the 'Per Op Code U_SNPM Body' field, the source ID field, the source T-group field, and the source T-adaptor mask field may be used to identify an adaptor of the source device when a session is initiated. The sink ID field, the sink T-group field and the sink T-adaptor mask field may be used to identify an adaptor of the sink device when a session is initiated.

Otherwise, the source ID field, the source T-group field, and the source T-adaptor mask field may be used as a This Partner T-adaptor Reference (TPTR) field indicating a T-adaptor of a current session partner. In addition, the sink ID field, the sink T-group field, and the sink T-adaptor field may be used as an Other Partner T-adaptor Reference (OPTR) field indicating a T-adaptor of another session partner.

FIG. 6(d) shows another structure of a session initiation response message. Referring to FIG. 6(d), the session initiation response message may include a Sender ID field indicating an ID of a device that transmits a session initiation response message; a Destination ID field for indicating a destination to which the session initiation response message will be transmitted; a message type field indicating a type of the corresponding message; and an OP code field indicating success or failure of session initiation.

In this case, the sender ID may be used to identify a management entity acting as a session partner that transmits a session initiation response message, and the destination ID may be used to identify an initiation entity transmitting a session initiation request message.

The session initiation response message may further include a session ID indicating a unique session of a source device; a Session Type field indicating which one of HDMI, Ethernet, USB, and IR is used as a type of an initiated session; a source ID for identifying a source device of a corresponding session; a source group field for indicating the port of group ports of a source when the corresponding session is coupled to other sessions; a source port ID indicating a port ID of a session source port of a source device; a source group ID for indicating the number of group ports of a source when the corresponding session is coupled to other sessions; and a sink port ID for identifying a session sink port of a sink device.

In the embodiments of the present invention, the term 'session coupling' indicates that one session is operated simultaneously with other sessions. For example, session coupling may indicate that a session for transmitting an HDMI packet is operated simultaneously with a session for transmitting a USB packet, or may indicate that a session for transmitting an HDMI packet is operated simultaneously with a session for transmitting an IR packet.

Figure 7:
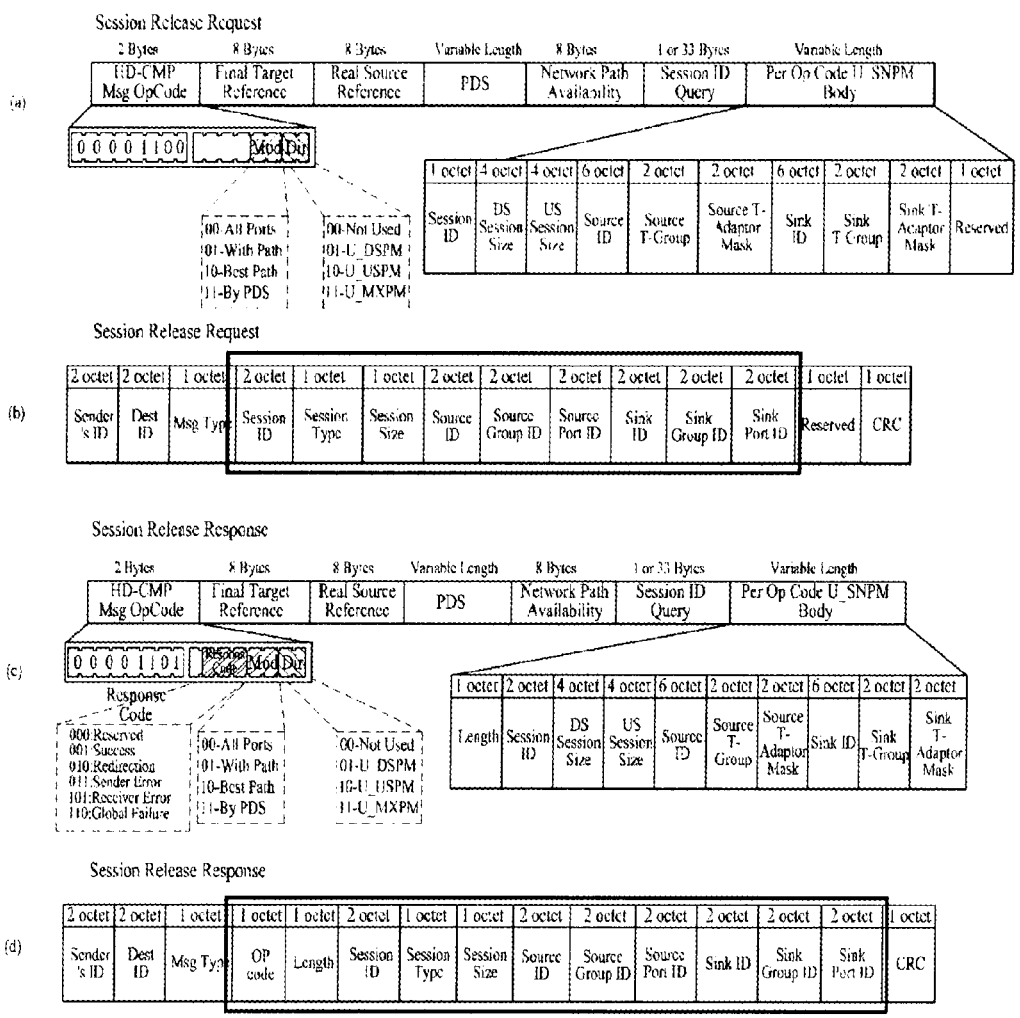
FIG. 7 is a structural view illustrating session release request messages and session release response messages according to embodiments of the present invention.

FIG. 7 is a structural view illustrating session release request messages and session release response messages according to embodiments of the present invention.

FIG. 7(a) shows an example of a Session Release Request message. Referring to FIG. 7(a), the session release request message may further include an HD-CMP Msg OpCode field, a Final Target Reference (FTR) field, a Source Reference field, a PDS field, a Network Path Availability (NPA) field, a Session ID Query (SIQ) field, and a 'Per Op Code U_SNPM body' field.

In FIG. 7(a), the HD-CMP Msg Op code field may include a Mod field indicating a method for transmitting a session release request message and a Dir field for indicating directivity of transmission of the session release request message.

The final target reference (FTR) field may be used to identify a session partner (e.g., a management entity of a destination) to which a session release request message will be transmitted, and may also be used to identify the initiation entity transmitting a session release request message. For example, the final target reference (FTR) field is 8 bytes long, and may include a MAC address and TPG identifier of a destination. The source reference field is 8 bytes king and may include a MAC address and TPG identifier of the initiation entity.

The PDS field includes information about PDS entities that indicate an input port of a device and an output port of the device. The network path availability (NPA) field indicates the amount of processable data and the number of accumulated packet streams. The SIQ field is adapted to search for an active session identifier or a pre-allocated session identifier in a network path.

The 'Per Op Code U_SNPM body' field of FIG. 7(a) has the same structure as the 'Per Op Code U_SNPM body' field of FIG. 6(a). Differently from the 'Per Op Code U_SNPM body' field of FIG. 6(a), the corresponding fields for releasing a session are used in the 'Per Op Code U_SNPM body' field of FIG. 7(a). Accordingly, for a description of the basic 'Per Op Code U_SNPM body' reference may be made to FIG. 6(a).

Referring to FIG. 7(b), the session release request may include a Sender ID field indicating an ID of a control point (CP) device transmitting a session release request message; a Destination ID field for identifying a device to which a session release request message is to be transmitted; a Message Type field indicating a type of the corresponding message; a Session ID field for uniquely identifying a session to be released; a Session Type field indicating a type of a session to be released; a Session Size field indicating the size of a session to be released; a Source Group ID field for indicating a group port number of a source when a current session is coupled to another session; a Source Port ID field for identifying a session source port of a source device; a Sink ID field for identifying a sink device selected by a control point (CP); a Sink Group ID field indicating a group port number of a sink when a current session is coupled to another session; and a Sink Port ID field for identifying a session sink port of the sink device.

In this case, the sender ID may be used to identify an initiation entity that transmits a session release request message, and the destination ID may be used to identify a management entity acting as a session partner of a destination to which the session release request message is transmitted. In addition, the session type field may indicate which one of HDMI data, Ethernet data, USB data, and IR data is the corresponding session.

In FIG. 7(b), a source group ID field may be set to any value other than '0' when the source device supports session coupling. If the source device supports session coupling and the source group ID field is not set to '0', the source port ID field may be set to null. In addition, if the sink device supports session coupling, the sink group ID field may be set to any value other than '0'. If the sink device supports session coupling and the sink group ID is set to any value other than '0', the sink port ID field may be set to null.

FIG. 7(c) shows an example of the session release response message structure. The session release response message shown in FIG. 7(c) has the same structure as the session release response message of FIG. 6(c). Differently from the session release response message of FIG. 6(c), the session release response message of FIG. 7(c) is used to release a session. That is, fields of FIG. 6(c) may be used for the session release response message.

For example, the HD-CMP Msg Opcode field may indicate that the corresponding message is a session release response. However, the 'Per Op Code U_SNPM body' field may further include a length field indicating the length of the Per Op Code U_SNPM body field. In addition, in the 'Per Op Code U_SNPM Body' field, if the session is released, the source ID field, the source T-group field, and the source T-adaptor mask field are used to identify the adaptor of the source device. In addition, the sink ID field, the sink T-group field, and the sink T-adaptor mask field are used to identify the adaptor of the sink device when the session is released.

FIG. 7(d) shows another structure of a session release response message. Referring to FIG. 7(d), the session release response message may include a Sender ID field indicating an ID of a device that transmits a session release response message; a Destination ID field for indicating a destination to which the session release response message will be transmitted; a message type field indicating a type of the corresponding message; an OP code field indicating success or failure of session initiation; a length field indicating the length of the session release response message; a Session ID field indicating a unique ID of a released session; a Session Type field indicating which one of HDMI, Ethernet, USB, and IR is used as a type of a released session; a Session Size field indicating the size of a released session; a Source ID field indicating a source device of the corresponding session; a Source Group ID field indicating the number of group ports of a source when the corresponding session is coupled to other sessions; a Source Port ID field indicating a port ID of a session source port of a source device; a source group ID field indicating the number of group ports of a source when the corresponding session is coupled to other sessions; and a Sink Port ID field indicating a sink port of a sink device.

Figure 8:
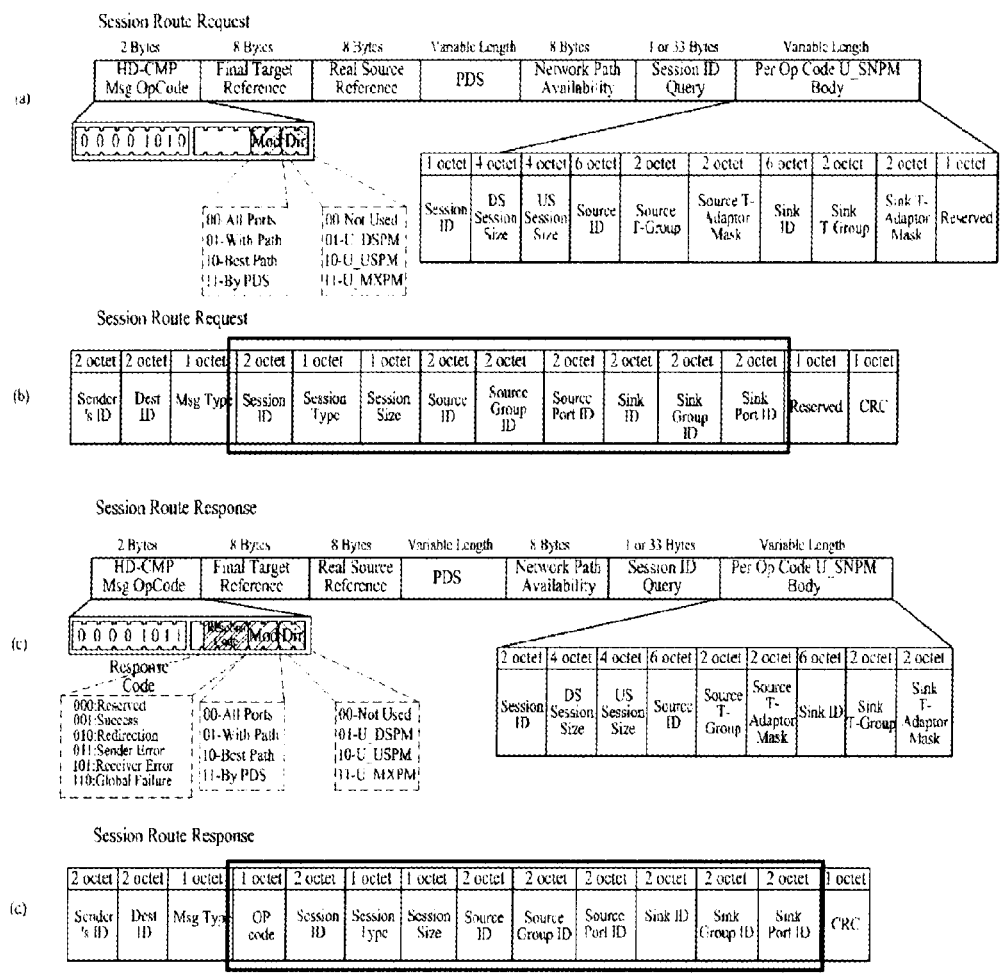
FIG. 8 is a structural view illustrating session route request messages and session route response messages according to embodiments of the present invention.

FIG. 8 is a structural view illustrating session route request messages and session route response messages according to embodiments of the present invention.

FIG. 8(a) shows one example of a session route request message structure. The session route request message structure shown in FIG. 8(a) is basically identical to the session initiation request message shown in FIG. 6(a). However, it should be noted that functions of respective fields shown in FIG. 8(a) are used for a session route request instead of session initiation, differently from FIG. 6(a). For example, the HD-CMP Msg OpCode field shown in FIG. 8(a) indicates that the corresponding message is used for the session route request.

In FIG. 8(a), the 'Per Op Code U_SNPM body' field acting as an HD-CMP payload may include a Session ID field for identifying a session for routing; a Session Size field indicating a downstream (DS) session size; an Upstream (US) Session Size field indicating an upstream (US) session size; a Source ID field indicating an ID of a source device selected by a control point (CP); a Source T-Group field that indicates a T-group and a port device of a source when the corresponding session is coupled to other sessions; a Source T-adaptor Mask field indicating a T-adaptor mask of a T-group of a source device; a Sink ID field indicating an ID of a sink device selected by a control point (CP); a Sink T-Group field indicating a T-group and a port device of a sink device when the corresponding session is coupled to other sessions; and a Sink T-adaptor Mask field indicating a T-adaptor mask of a T-group of a sink device.

In this case, in several fields contained in the 'Per Op Code U_SNPM body' field, a source device indicates a device for providing content, and a sink device indicates a device for receiving content. If a session of the source device is coupled to a session of the sink device, each of the source T-group ID field and the sink T-group ID field is set to any value other than '0'. However, if the source device supports coupling between sessions and a source group token number is not set to '0', the source T-adaptor mask field is set to null. If the source device supports session coupling and the sink T-group is not set to '0', the sink T-adaptor mask field is set to null. In this case, if each of the source T-group ID and the sink T-group ID is not set to '0' and each of the source T-adaptor mask field and the sink T'-adaptor mask field is set to any value other than '0', a session may be initiated.

In other words, the source ID field, the source T-group field, and the source T-adaptor field may be used as a This Partner T-adaptor Reference (TPTR) field. In addition, the sink ID field, the sink T-group field, and the sink T-adaptor field may be used as an Other Partner T-adaptor Reference (OPTR) field indicating a T-adaptor of another session partner.

FIG. 8(b) shows another example of a session initiation request message structure. Referring to FIG. 8(b), the session route request message may include a Sender ID field indicating an entity for transmitting a session route request message; a Destination ID field for indicating a destination to which the session route request message is to be transmitted; a message (MSG) type field indicating a type of the corresponding message; a Session ID field indicating a unique ID of a session for routing; a Session Type Field indicating which one of HDMI data, Ethernet data, USB data, and IR data belongs to a session to be routed; a Session Size field indicating the size of a session to be routed; a Sender ID field indicating an ID of a control point (CP) device transmitting the session route request message; a Destination ID field for identifying a device to which the session route request message is to be transmitted; a Message Type field indicating a type of the corresponding message; a Source Group ID field indicating a group port number of a source when a current session is coupled to other sessions; a Source Port ID field for identifying a session source port of the source device; a Sink ID field for identifying a sink device selected by a control point (CP); a Sink Group ID field indicating a group port number of a sink when a current session is coupled to other sessions; and a Sink Port ID field for identifying a session sink port of the sink device.

In this case, the sender ID field may be used to identify the initiation entity for transmitting the session route request message, and the destination ID field may be used to identify a management entity acting as a session partner of a destination to which the session route request message is transmitted.

In FIG. 8(b), the source group ID field may be set to any value other than '0' when the source device supports session coupling. If the source device supports session coupling and the source group ID field is not set to '0', the source port ID field may be set to null. In addition, if the sink device supports session coupling, the sink group ID field may be set to any value other than '0'. If the sink device supports session coupling and the sink group ID is not set to '0', the sink port ID field may be set to null. In this case, if each of the source group ID and the sink group ID is not set to '0' and each of the source port ID and the sink port ID is not set to '0', a session may be initiated.

In other words, the source ID field, the source group field and the source port field may be used as a This Partner T-adaptor Reference (TPTR) field. In addition, the sink ID field, the sink group field, and the sink port field may be used as an Other Partner T-adaptor Reference (OPTR) field indicating a T-adaptor of another session partner.

FIG. 8(c) shows one example of the session route response message structure. The session route response message of FIG. 8(c) is identical to the session route request message of FIG. 8(a). However, the HD-CMP Msg OpCode field contained in the session route response message indicates that the corresponding message is a session route response message, and may further include a Response Code field. In this case, the response code field is 3 bits long, may indicate success of a session initiation request, may indicate a Redirection status in which another device has attempted to send a request, may indicate a Sender Error status in which a request is not completed because of an error encountered in the request and a request may be reattempted when the error is corrected, may indicate a Receiver Error status in which a request is not completed because of an error of a recipient and the request may be reattempted to another device, and may indicate a Global Failure status in which a session initiation request fails and is not re-attempted.

In addition, the 'Per Op Code U_SNPM body' field of FIG. 8(c) is similar to that of FIG. 8(a). However, the session mute response message is transmitted as a response to the session route request message. Content of each field may be changed by a management entity transmitting the session route response message.

FIG. 8(d) shows another structure of the session route response message. Referring to FIG. 8(d), the session route response message is similar to the session route request message of FIG. 8(b). However, the session route response message of FIG. 8(d) further includes an Op Code field indicating success or failure of session route request. Although the remaining fields basically have the same structure as those of FIG. 8(b), the remaining fields may be changed according to the session route response message as necessary.

Figure 9:
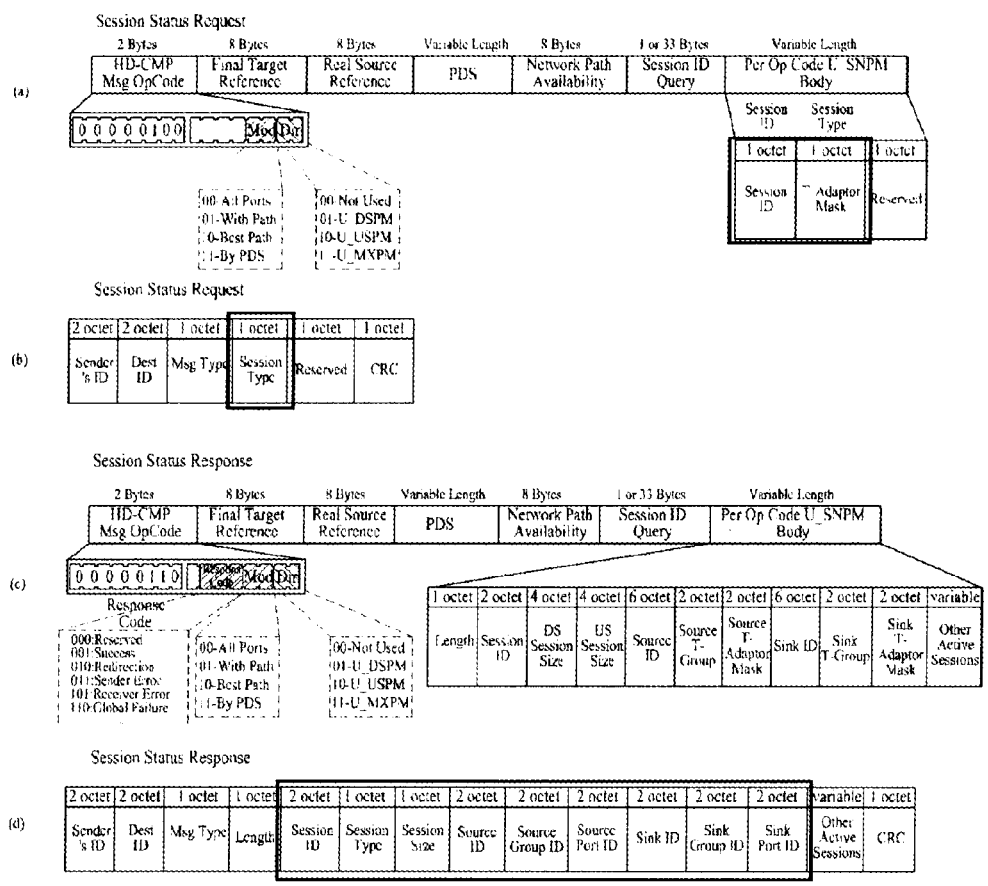
FIG. 9 is a structural view illustrating session status request messages and session status response messages according to embodiments of the present invention.

FIG. 9 is a structural view illustrating session status request messages and session status response messages according to embodiments of the present invention.

The control point (CP) entity transmits a session status request message such that it can request information regarding the currently activated session. The session status request message may be transmitted and received between management entities through a unicast SNPM (U-SNPM) message over the HDBaseT sub-network.

In addition, the HDBaseT devices need to maintain information regarding the currently active sessions. Therefore, if the control point (CP) requests a session status of the HDBaseT device, the corresponding HDBaseT device has to inform a control point (CP) of information about all the active sessions known by the corresponding HDBaseT device. In this case, the session status response message may be used.

The Session Status (SSTS) response message may be transmitted as a response to the session status response message. Otherwise, if the corresponding session status changes, the SSTS response message may be transmitted.

The session status (SSTS) response message may be transmitted as a response to a session status request message. In addition, the SSTS response message may also be transmitted when the corresponding session status changes. The session status (SSTS) response message may be transmitted over Ethernet using HD-CMP messages.

FIG. 9(a) shows one example of the session status request message structure. Referring to FIG. 9(a), the session status request message may include an HD-CMP Msg OpCode field, a Final Target Reference (FTR) field, a Real Source Reference field, a Path Description Section (PDS) field, a Network Path Availability (NPA) indicating an available network path, a Session ID Query (SIQ) field, and a 'Per OP Code U_SNPM body' field acting as an HD-CMP payload.

In FIG. 9(a), the 'HD-CMP Msg OpCode' field may include a Mod field indicating a transmission method of the session status request message and a Dir field indicating directivity for transmission of the session status request message.

The Final Target Reference (FTR) field is used to identify a session partner (e.g., a management entity of the final destination) to which the session status request message is to be transmitted, and the Real Source Reference field is used to identify an initiation entity for transmitting a session status request message. For example, the final target reference (FTR) field is 8 bytes long, and may include a MAC address and a TPG identifier of a destination. The real source reference (RSR) field is 8 bytes long, and may include a MAC address and a TPG identifier (ID) of the initiation entity.

The PDS field includes information about PDS entities indicating an input port of the device and an output port of the device. The network path availability (NPA) field indicates the amount of processable data and the number of accumulated packet streams. The SIQ field is adapted to search for an active session identifier or a pre-allocated session identifier in a network path.

In FIG. 9(a), the 'Per Op Code U_SNPM Body' field acting as an HD-CMP payload may include a session ID field for identifying a session, a status of which is to be recognized, and a T-adaptor mask field for identifying T-adaptors of the corresponding session. In this case, the T-adaptor mask field may indicate a type of a session used for requesting a current status.

FIG. 9(b) shows another example of a session status request message structure. Referring to FIG. 9(b), the session status request message may include a Sender ID field for indicating an ID of a control point (CP) device transmitting a session status request message; a Destination ID field for identifying a device to which the session status request message is to be transmitted; a Message Type field indicating that the corresponding message is a session status request message; and a Session Type field indicating which one of HDMI data, Ethernet data, USB data and IR data is set to the session type.

FIG. 9(c) shows one example of the session status response message structure. Referring to FIG. 9(c), the session status response message is basically identical to the session status request message of FIG. 9(a). Differently from the fields shown in FIG. 9(a), functions of individual fields contained in the session status response message are used to indicate the session status.

For example, the HD-CMP Msg OpCode field indicates that the corresponding message is a session status response message, and may further include a response code field. The response code field is 3 bits long, may indicate success of a session initiation request, may indicate a Redirection status in which another device has attempted to send a request, may indicate a Sender Error status in which a request is not completed because of an error encountered in the request and a request may be reattempted when the error is corrected, may indicate a Receiver Error status in which a request is not completed because of an error of a recipient and the request may be reattempted to another device, and may indicate a Global Failure status in which a session initiation request fails and is not re-attempted.

In addition, the 'Per Op Code U_SNPM Body' field acting as an HD-CMP payload includes a length field indicating the length of active session information. The length field may be changed according to the number of active sessions of the corresponding device. In addition, the 'Per Op Code U_SNPM body' field may further include a Session ID field indicating a unique session ID of a source device; a downstream (DS) Session Size field indicating the size of downstream (DS) data of a session indicated by the NPA field; an upstream (US) Session Size field indicating the size of upstream (US) data of a session indicated by the NPA field; a Source ID field indicating an identifier (ID) of a source device selected by a control point (CP); a Source T-Group field indicating a T-group ID of a source when the corresponding session is coupled to another session; a Source T-adaptor Mask field indicating a T-adaptor mask of a T-group of the source device; a Sink ID field indicating an ID of a sink device selected by a control point (CP); a Sink T-group field indicating a T-group of a sink when the current session is coupled to other sessions; and a Sink T-adaptor Mask field indicating a T-adaptor mask of a T-group of the sink device. In addition, if there is another active session, the 'Per Op Code U_SNPM Body' field of the session status response message may further include an Other Active Session field including information about other active sessions.

In the 'Per Op Code U_SNPM Body' field, if the session is initiated, the source ID field, the source T-group field, and the source T-adaptor mask field are used to identify the adaptor of the source device. If the session is initiated, the sink ID field, the sink T-group field, and the sink T-adaptor mask field may be used to identify the adaptor of the sink device.

FIG. 9(d) shows one example of a session status response message structure. Referring to FIG. 9(d), the session status response message may include a Sender ID field for indicating an ID of a device transmitting the session status response message; a Destination ID field indicating a destination to which the session status response message is to be transmitted; a message type field indicating a type of the corresponding message; a length field indicating the size of information regarding an active session; a Session ID field indicating a unique session of the source device; a Session Type field indicating which one of HDMI, Ethernet, USB, and IR is the initiated session type; a Source ID field for identifying a source device of the corresponding session; a Source Group field indicating the number of group ports of a source when the corresponding session is coupled to other sessions; a Source Port ID field indicating a port ID of a session source port of the source device; a Source Group ID indicating the number of group ports of a source when the corresponding session is coupled to other sessions; and a Sink Port ID for identifying a Session Sink Port of the sink device.

Figure 10:
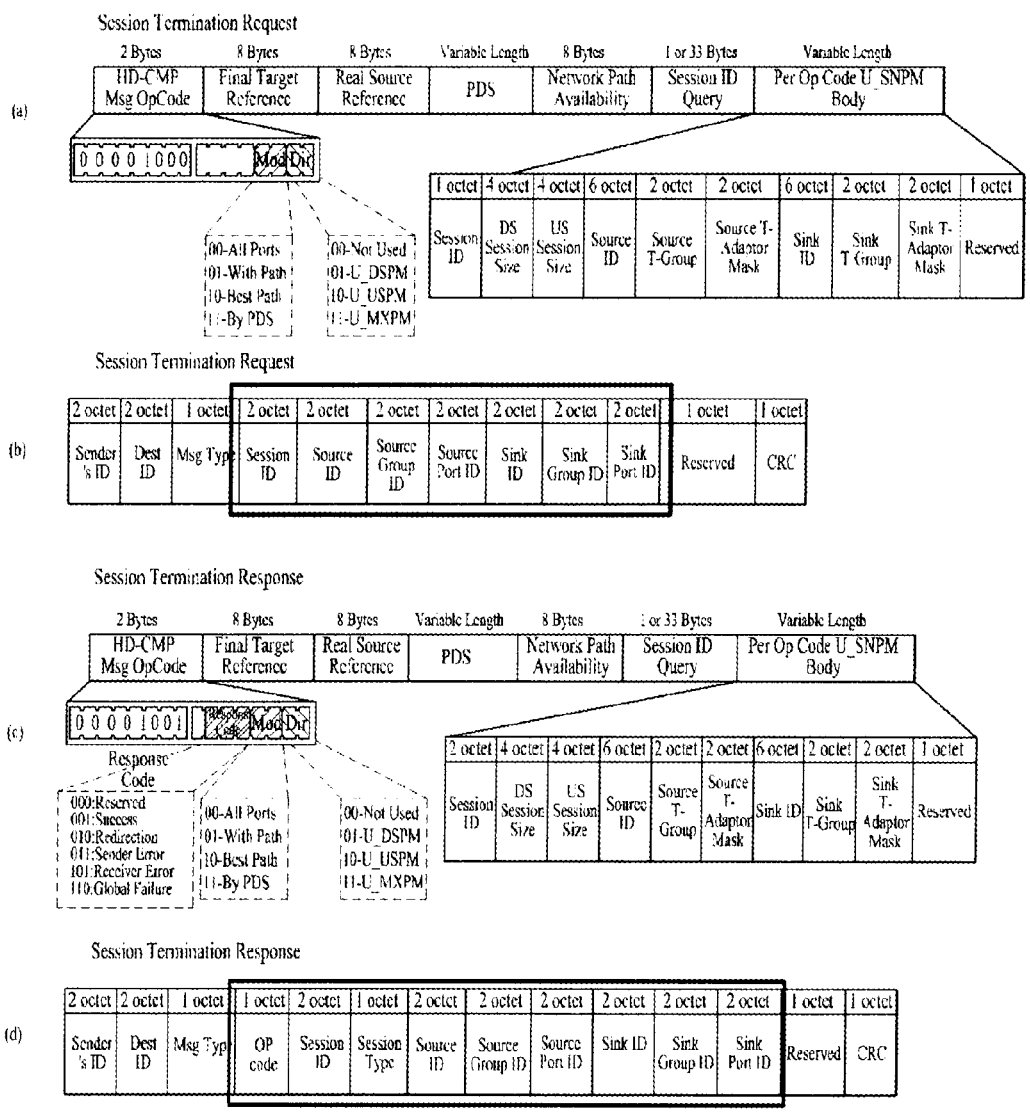
FIG. 10 is a structural view illustrating session termination request messages and session termination response messages according to embodiment % of the present invention.

FIG. 10 is a structural view illustrating session termination request messages and session termination response messages according to embodiments of the present invention.

In the embodiments of the present invention, the session termination messages may be referred to as a Session Termination U_SNPM messages. The session termination messages may be transmitted to devices participating in the corresponding session so as to terminate the session. Session termination messages may be created in one session partner or may be transmitted to a different session partner or an intermediate SDME. The session termination messages may be capsulated in the form of short HLIC packets so as to prevent network overhead and the processing delay from being generated, and then transmitted. After the device or intermediate SDME transmits a session termination message, it deletes resources of the corresponding session. The destination partner having received the session termination message deletes session resources.

FIG. 10(a) shows one example of the session termination request message structure. Referring to FIG. 10(a), the session termination request message may include an HD-CMP Msg OpCode field, a Final Target Reference field, a Real Source Reference field, a Path Description Section (PDS) field, a network path availability (NPA) field indicating an available network path, a Session ID Query (SIQ) field, a 'Per Op Code U_SNPM body' field acting as an HD-CMP payload.

In FIG. 10(a), the 'HD-CMP Msg OpCode' field may include a Mod field indicating a method for transmitting a session termination request message and a Dir field for indicating directivity of transmission of the session termination request message.

The final target reference (FTR) field may be used to identify a session partner (e.g., a management entity of a destination) to which a session termination request message will be transmitted, and may also be used to identify the initiation entity transmitting a session termination request message. For example, the final target reference (FTR) field is 8 bytes long, and may include a MAC address and TPG identifier of a destination. The source reference field is 8 bytes long and may include a MAC address and TPG identifier of the initiation entity.

The PDS field includes information about PDS entities that indicate an input port of a device and an output port of the device. The network path availability (NPA) field indicates the amount of processable data and the number of accumulated packet streams. The SIQ field is adapted to search for an active session identifier or a pre-allocated session identifier in a network path.

Referring to FIG. 10(a), the 'Per Op Code U_SNPM body' field acting as an HD-CMP payload may include a Session ID field for identifying a session to be terminated; a downstream (DS) Session Size field indicating a downstream (DS) session size; an Upstream (US) Session Size field indicating an upstream (US) session size; a Source ID field indicating an ID of a source device selected by a control point (CP); a Source T-Group field that indicates a T-group and a port device of a source when the corresponding session is coupled to other sessions; a Source T-adaptor Mask field indicating a T-adaptor mask of a T-group of a source device; a Sink ID field indicating an ID of a sink device selected by a control point (CP); a Sink T-Group field indicating a T-group and a port device of a sink device when the corresponding session is coupled to other sessions; and a Sink T-adaptor Mask field indicating a T-adaptor mask of a T-group of a sink device.

In this case, in several fields contained in the 'Per Op Code U_SNPM body' field, a source device indicates a device for providing content, and a sink device indicates a device for receiving content. If a session of the source device is coupled to a session of the sink device, each of the source T-group ID field and the sink T-group ID field is set to any value other than '0'. However, if the source device supports coupling between sessions and a source group token number is not set to '0', the source T-adaptor mask field is set to null. If the source device supports session coupling and the sink T-group is not set to '0', the sink T-adaptor mask field is set to null. In this case, if each of the source T-group ID and the sink T-group ID is not set to '0' and each of the source T-adaptor mask field and the sink T-adaptor mask field is set to any value other than '0', a session may be initiated.

In other words, the source ID field, the source T-group field, and the source T-adaptor field may be used as a This Partner T-adaptor Reference (TPTR) field. In addition, the sink ID field, the sink T-group field, and the sink T-adaptor field may be used as an Other Partner T-adaptor Reference (OPTR) field indicating a T-adaptor of another session partner.

FIG. 10(b) shows another example of a session termination request message structure. Referring to FIG. 10(b), the session termination request message may include a Sender ID field indicating an ID of a control point (CP) device transmitting a session termination request message; a Destination ID field for identifying a device to which the session termination request message is to be transmitted; a message (Msg) type field indicating a type of the corresponding message; a Session ID field for identifying a session to be terminated; a Source ID field for identifying a source device of a session to be terminated; a Source Group ID field indicating a group port number of a source when a current session is coupled to other sessions; a Source Port ID field for identifying a session source port of the source device; a Sink ID field for identifying a sink device selected by a control point (CP); a Sink Group ID field indicating a group port number of a sink when a current session is coupled to other sessions; and a Sink Port ID field for identifying a session sink port of the sink device.

In this case, the sender ID field may be used to identify the initiation entity for transmitting the session termination request message, and the destination ID field may be used to identify a management entity acting as a session partner of a destination to which the session termination request message is transmitted.

In FIG. 10(b), the source group ID field may be set to any value other than '0' when the source device supports session coupling. If the source device supports session coupling and the source group ID field is not set to '0', the source port ID field may be set to null. In addition, if the sink device supports session coupling, the sink group ID field may be set to any value other than '0'. If the sink device supports session coupling and the sink group ID is not set to '0', the sink port ID field may be set to null. In this case, if each of the source group ID and the sink group ID is not set to '0' and each of the source port ID and the sink port ID is not set to '0', a session may be initiated.

In other words, the source ID field, the source group field and the source port field may be used as a This Partner T-adaptor Reference (TPTR) field. In addition, the sink ID field, the sink group field, and the sink port field may be used as an Other Partner T-adaptor Reference (OPTR) field indicating a T-adaptor of another session partner.

FIG. 10(c) shows one example of the session termination response message structure. Referring to FIG. 10(c), the session termination response message is basically identical to the session termination request message. Differently from the session termination request message, functions of individual fields of the session termination response message are used for the session termination response. Accordingly, for a description of the same parts between the session termination request message and the session termination response message reference can be made to FIG. 10(a), and only different parts therebetween will hereinafter be described in detail.

In FIG. 10(c), the HD-CMP Msg OpCode field indicates that the corresponding message is a session termination response message, and may further include a Response Code field. In this case, the response code field is 3 bits long, may indicate success of a session termination request, may indicate a Redirection status in which another device has attempted to send a request, may indicate a Sender Error status in which a request is not completed because of an error encountered in the request and a request may be reattempted when the error is corrected, may indicate a Receiver Error status in which a request is not completed because of an error of a recipient and the request may be reattempted to another device, and may indicate a Global Failure status in which a session termination request fails and is not re-attempted.

The 'Per Op Code U_SNPM body' field acting as an HD-CMP payload may include the same fields as those of the 'Per Op Code U_SNPM body' field of FIG. 10(a). In this case, in several fields contained in the 'Per Op Code U_SNPM body' field, a source device indicates a device for providing content, and a sink device indicates a device for receiving content. If a session of the source device is coupled to a session of the sink device, each of the source T-group ID field and the sink T-group ID field is set to any value other than '0'. However, if the source device supports coupling between sessions and a source group token number is not set to '0', the source T-adaptor mask field is set to null. If the source device supports session coupling and the sink T-group is not set to '0', the sink T-adaptor mask field is set to null. In this case, if each of the source T-group ID and the sink T-group ID is not set to '0' and each of the source T-adaptor mask field and the sink T-adaptor mask field is set to any value other than '0', a session may be initiated.

In other words, the source ID field, the source T-group field, and the source T-adaptor field may be used as a This Partner T-adaptor Reference (TPTR) field. In addition, the sink ID field, the sink T-group field, and the sink T-adaptor field may be used as an Other Partner T-adaptor Reference (OPTR) field indicating a T-adaptor of another session partner.

FIG. 10(d) shows another example of the session termination response message structure. Referring to FIG. 10(d), the session termination response message includes all the fields contained in the session termination response message of FIG. 10(b). In addition, the session termination response message of FIG. 10(d) further includes an Op Code field indicating success or failure of the session termination request. Although the remaining fields contained in the session termination response message perform the same functions as those of fields contained in the session termination request message, the remaining fields of the session termination response message are used for session termination response differently from the session termination request message.

The above-mentioned messages may further include at least one of a Cyclic Redundancy Check (CRC) field for error correction and a Reserved field reserved for other fields. In addition, the size of fields contained in the above-mentioned messages of FIGS. 6 to 10 may be set to a predetermined size denoted in the corresponding drawing.

In addition, the same fields (having the same names) from among individual fields contained in respective messages shown in FIGS. 6 to 10 may perform the same functions. However, functions of the above-mentioned fields may be changed according to purposes of the corresponding message.

3. Session Routing and Session Terms

In general, differently from "Dynamic Switching/Routing Per Packet' methods well known in the art, the T-network is operated using sessions, each of which is operated as a fixed path. The session route is formed on the sub-network, and is unchanged. Provided that network topology/conditions and the like change, the route (i.e., path) of the corresponding session is not valid any more, the corresponding session must be terminated, and a different session must be formed.

If the corresponding session is operated on a specific path, packets in the HDBaseT network are routed by T-switches according to an SID token. For example, packets received in the HDBaseT network are routed using a simple switching table along with a session ID.

Therefore, the major session routing identifies an available valid path/SID to form a specific session, and selects an optimum path (i.e., a valid path) from among the identified paths/SIDs. Provided that specific conditions are satisfied, "Valid Path" is configured not to exceed 5 hops between entities, and the valid path has the DS and US processing amount larger than the required processing amount needed by a session per path. The valid path has the DS and US processing amount larger than the required processing amount needed by a session per path. A unique Session ID (SID) may be assigned to the valid path. That is, the corresponding SID is not used in any other switch on the existing path.

A brief description of terms for use in the session creating process is as follows. The initiation entity may be used as a management entity for requesting session initiation, and may be any of control point (CP), PDME, SDME, and/or CPME. The selection entity (also called 'Selecting Entity') may indicate an entity for selecting one of available paths that are capable of forming a session.

The session is defined between both ends of management entities (and T-group/T-adaptor connected to the management entities), and each of the management entities may be referred to a Session Partner. A first partner is indicative of one of session partner entities selected by an initiation entity, and a second partner is indicative of the other one from among session partner entities.

Unintended PDME/SDME acting as one of session partners cannot be used as the initiation entity for the corresponding session. Only the CPME can initiate the session without participating in the session partner. PDME/SDME operating as the initiation entity may operate as the second partner.

4. Method for Exchanging Session Status

Figure 11:
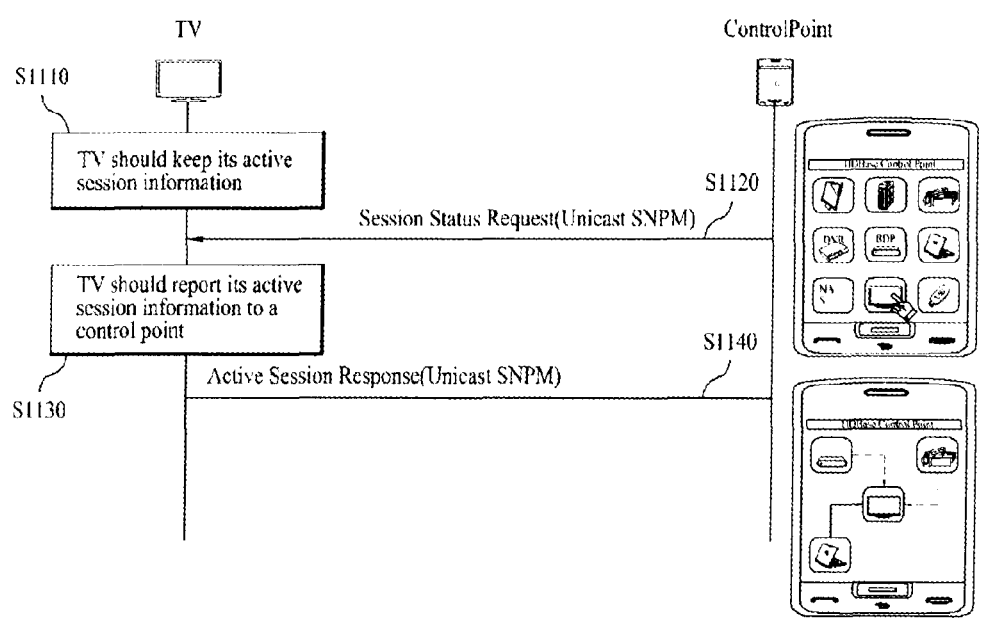
FIG. 11 is a flowchart illustrating a representative one of various methods for requesting a session status according to embodiments of the present invention.

FIG. 11 is a flowchart illustrating a representative one of various methods for requesting a session status according to embodiments of the present invention.

HDBaseT devices have to recognize information about the active session. In addition, it is preferable that the HDBaseT devices report information regarding the active session associated with the HDBaseT devices to the control point (CP). In addition, the control point (CP) can be found by matching the selected device to other active devices. In this case, performance of each device may be acquired through the Device Discovery procedure.

Referring to FIG. 11, a representative example of the HDBaseT device is a TV. TV may be a sink device for displaying content. When receiving/providing broadcast information, the HDBaseT device may operate as a source device. The TV may have session information of an active session connected to the TV in step S1110.

The user selects a TV from a home screen image or a control screen image of the control point (CP). If the TV is selected, the control point (CP) may transmit a session status request message to the TV using a unicast SNPM message format, such that it can request TV-related session information in step S1120.

TV having received the session status request message collects and obtains information so as to report session information of an active session connected to the TV to the control point (CP) in step S1130.

The TV may transmit the obtained session information to the control point (CP) through the session status response message in step S1140.

The session status request message and the session status response message shown in FIG. 11 may use messages shown in FIG. 9. In addition, although the present invention exemplarily uses a TV as an HDBaseT device, the HDBaseT device may also be set to any of a camcorder, a Blueray Disc Player (BDP), a Laptop, and/or an XBOX, etc. without departing from the scope or spirit of the present invention.

5. Method for Initiating and Forming Session

Figure 12:
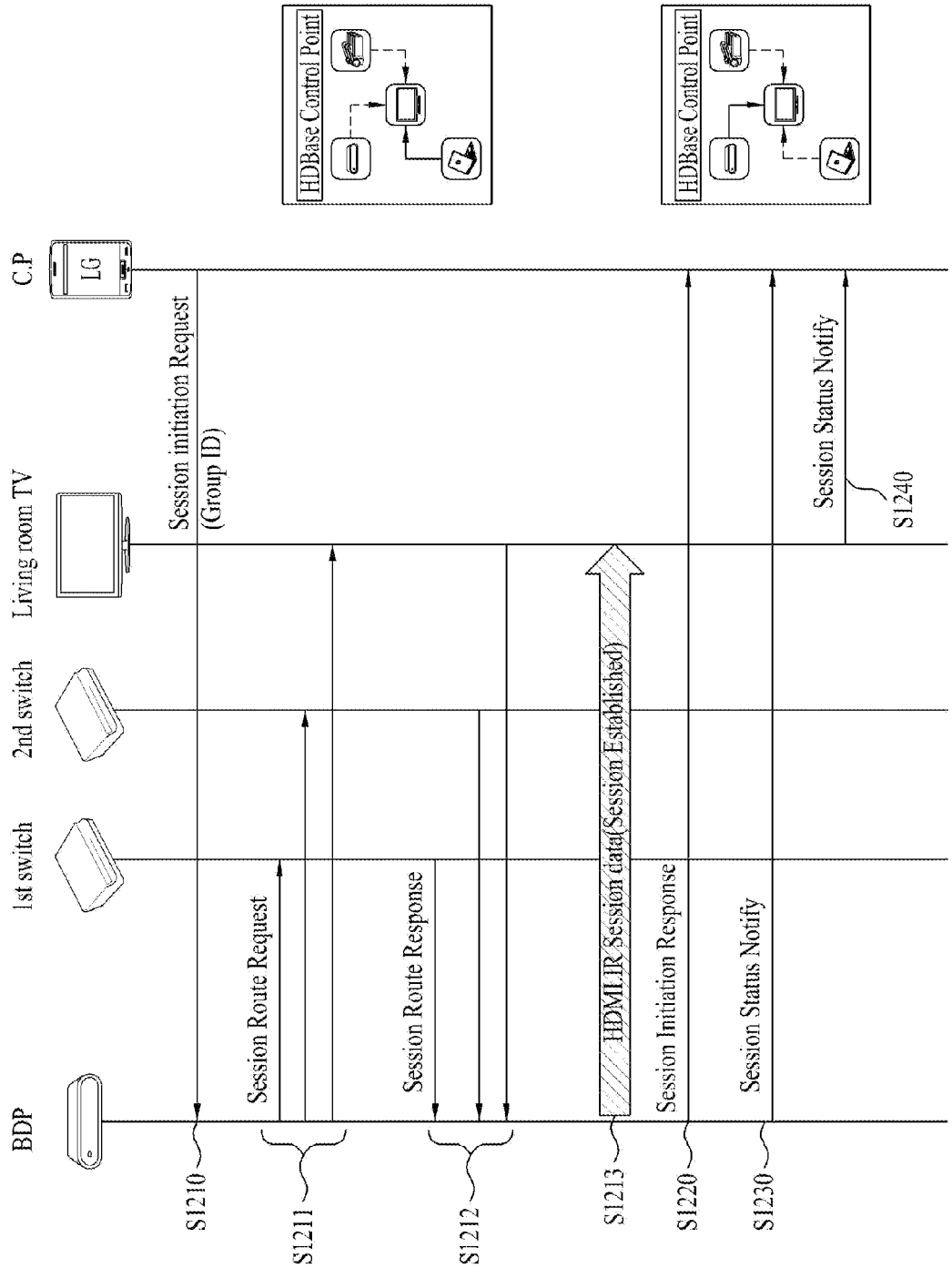
FIG. 12 is a flowchart illustrating a representative one of various methods for carrying out a session creating process according to embodiments of the present invention.

FIG. 12 is a flowchart illustrating a representative one of various methods for carrying out a session creating process according to embodiments of the present invention.

FIG. 12 shows that session initiation is requested in the control point (CP). In more detail, FIG. 12 shows a method for using a Centralized Routing Scheme (CRS). The CRS scheme may be used when the Routing Processor Entity (RPE) is implemented on a CPME function of the HDBaseT network.

A combination of RPE and CPME can be used to confirm and maintain the entire topology and status of each link on the network. When each session is formed, the combination between RPE and CPME may calculate an optimum path for each session and a valid session ID (SID) for each session. RPE/CPME combination may be implemented in an end node, a switch, or an Ethernet device. The RPE/CPME combination can perform muting/SID calculation at higher speed, such that the session can also be more quickly formed. The RPW/CPME combination use Knowledge Base, and may provide Session Routing calculation upon receiving a request from the management entity.

In FIG. 12, it is assumed that RPE/CPME combination is configured in an end node (e.g., BDP or CP) and a switch. In addition, for convenience of description and better understanding of the present invention, the embodiments of the present invention will hereinafter be described with respect to the term for representing the entire device.

Referring to FIG. 12, if the control point (CP) collects information about the currently activated session as shown in FIG. 11, currently connectable HDBaseT devices may be displayed on the CP screen. In this case, if the user selects the Blu-ray Disc Player (BDP) as a source provider, the CP may select an HDMI source T-adaptor of the BDP as a first partner entity, and may select an HDMI sink T-adaptor of a TV as a second partner entity. In addition, the CP acting as the initiation entity may transmit the session initiation request message including a session group ID to the BDP so as to confirm a session creating possibility of partner entities and requirements of the partner entities in step S1210.

The session request message in step S1210 may use the session request message shown in FIG. 6. In this case, the Final Target Reference (FTR) field is indicative of a BDP acting as a destination, the source ID identifies a BDP acting as a source, and the sink ID may indicate a living room TV acting as a display.

However, since only the group ID is established in the session initiation request message of FIG. 12, the CPME of the CP determines all the T-adaptors capable of being connected to the BDP operating as the first partner and the living room TV operating as the second partner, such that it can command the forming of session.

The BDP having received the session initiation request message can search for an optimum path so as to provide content to the living room TV. For this purpose, the BDP may transmit a Session Route Request message to each of the first switch, the second switch, and the living room TV in step S1211.

Upon receiving the session route request message, the first switch, the second switch, and the living room TV may transmit a session route response message including information of a BDP-related active session to a BDP in step S1212.

A session is formed between the BDP and the living room TV in steps S1211 and S1212, and the BDP may transmit HDMI data and/or IR data to the living room TV through a predetermined path in step S1213.

In addition, the BDP transmits a Session Initiation Response message to the control point (CP) so as to report the result of the formed session in step S1220.

In this case, the session initiation response message in step S1220 may refer to the session initiation response message of FIG. 6.

In addition, the BDP and the living room TV may periodically report link status information of the HDBaseT link to the control point (CP) or may also report the link status information of the HDBaseT link to the CP whenever status information is changed. In addition, if the RPE contained in the CP pre-calculates an optimum path, steps S1211 to S1212 may be omitted.

Figure 13:
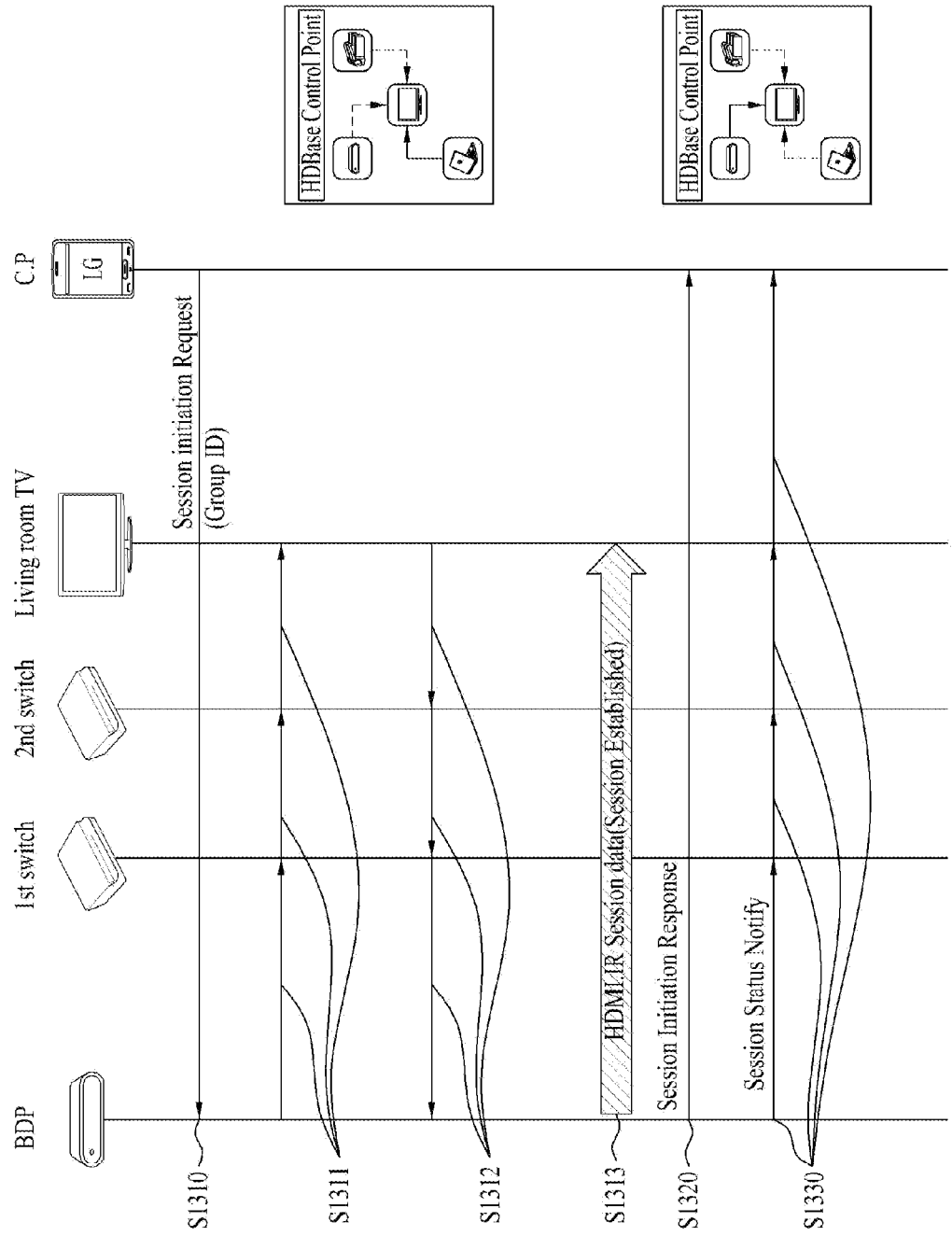
FIG. 13 is a flowchart illustrating a representative one of various methods for carrying out a session creating process according to embodiments of the present invention.

FIG. 13 is a flowchart illustrating another one of various methods for carrying out a session creating process according to embodiments of the present invention.

FIG. 13 shows that the control point (CP) requests session initiation, and also shows a Distributed Routing Scheme (DRS). The DRS method can allow a session to be formed between T-adaptors, irrespective of the presence or absence of an HDBaseT control point function in the HDBaseT network. The DRS method controls a network using an extended legacy control function such as an extended HDMI-CEC and USB.

In the DRS method, each T-adaptor may initiate/keep/terminate a session connected to another T-adaptor on a sub-network through a management entity such as PDME/SDME, etc. The DRS scheme may allow a necessary operation along with the routing processor entity (RPE) capable of maintaining all knowledge of network topology and link/device states, or may also allow such a necessary operation without using the RPE.

Referring to FIG. 13, if the user selects a BDP (first partner entity) as a source provider, the CP may transmit a session initiation request message for session initiation to the BDP in step S1310.

In order to search for an optimum path, the BDP having received the session initiation request message transmits a session route request message in which a TV (second partner entity) is masked as a final destination entity reference field to the first switch, the first switch transmits the received session route request message to the second switch, and the second switch transmits the session route request message to a TV acting as the final destination in step S1311.

The TV may select an optimum path, and may transmit a session route response message including optimum path information to the BDP through the second switch and the first switch in step S1312.

If the BDP receives the session route response message, a session between the BDP and the TV is formed, and the BDP may provide HDMI data and/or IR data to the TV in step S1313.

The BDP may transmit a session initiation response message to the control point (CP) so as to inform the CP of information about the newly formed session in step S1320.

In addition, the BDP may transmit the newly formed session information to all the CPs contained in the HDBaseT network using a Session Status Notify (SSN) message in step S1330.

In FIG. 13, the session initiation request message and the session initiation response message may be made to FIG. 6, and the session route request message and the session route response message may be made to FIG. 8.

Figure 14:
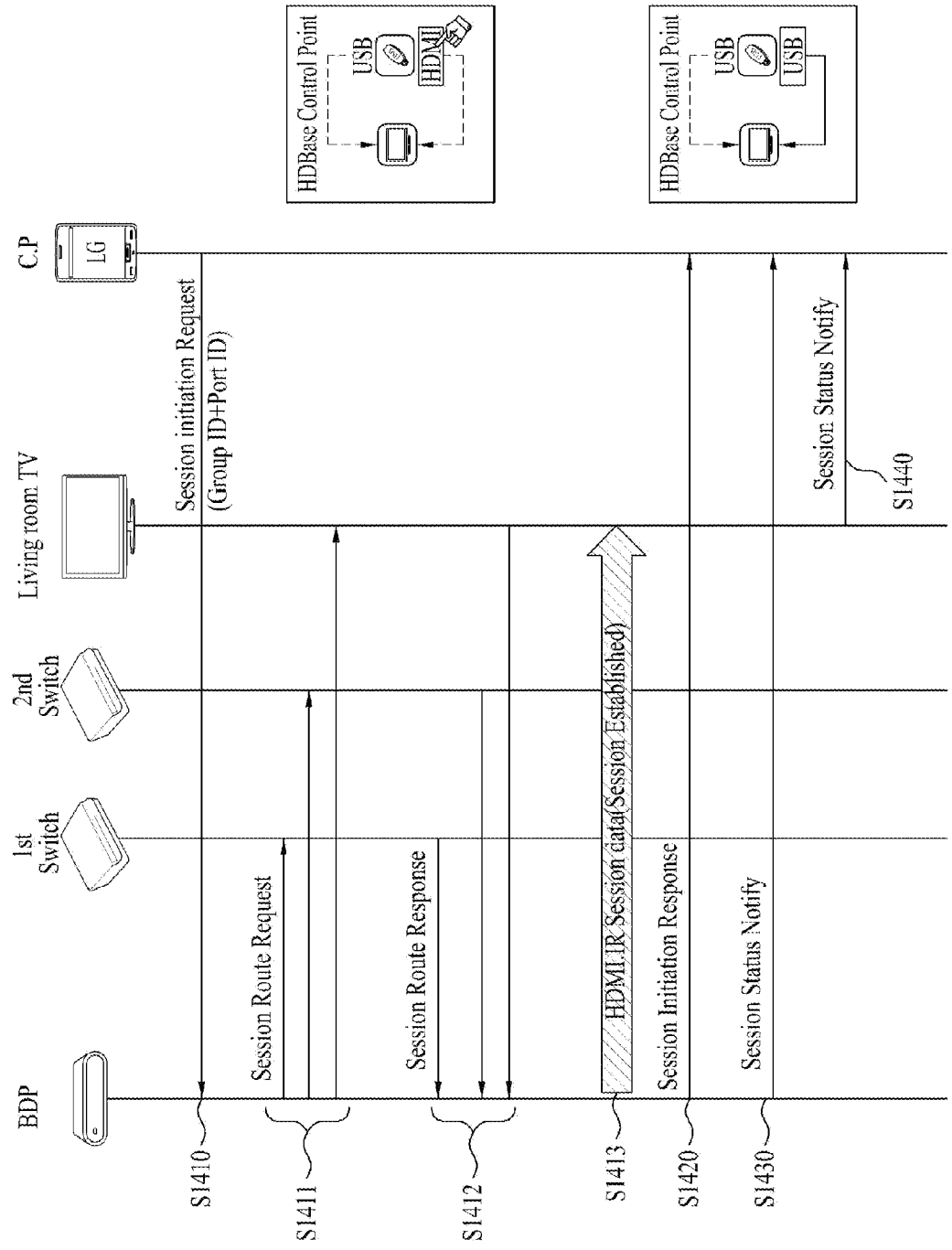
FIG. 14 is a flowchart illustrating another example of various session creating methods according to embodiments of the present invention.

FIG. 14 is a flowchart illustrating another example of various session creating methods according to embodiments of the present invention.

The session creating process of FIG. 14 is similar to that of FIG. 12. The session creating process of FIG. 14 forms an Interface-to-interface session, whereas the session creating process of FIG. 12 forms a Device-to-Device session.

Therefore, the session initiation request message including a T-group ID and a port ID may be transmitted as a source provider to the camcorder in step S1410. In other words, if the CP requests session initiation, the T-group ID and the port ID are contained in the session initiation request message, and T'-adaptors of the BDP acting as the first partner and the TV acting as the second partner are assigned to a user-designated port such that the CP can request such session initiation.

Description of the remaining steps S1411 to S1440 of FIG. 14 may refer to steps S1211 to S1240 of FIG. 12.

Figure 15:
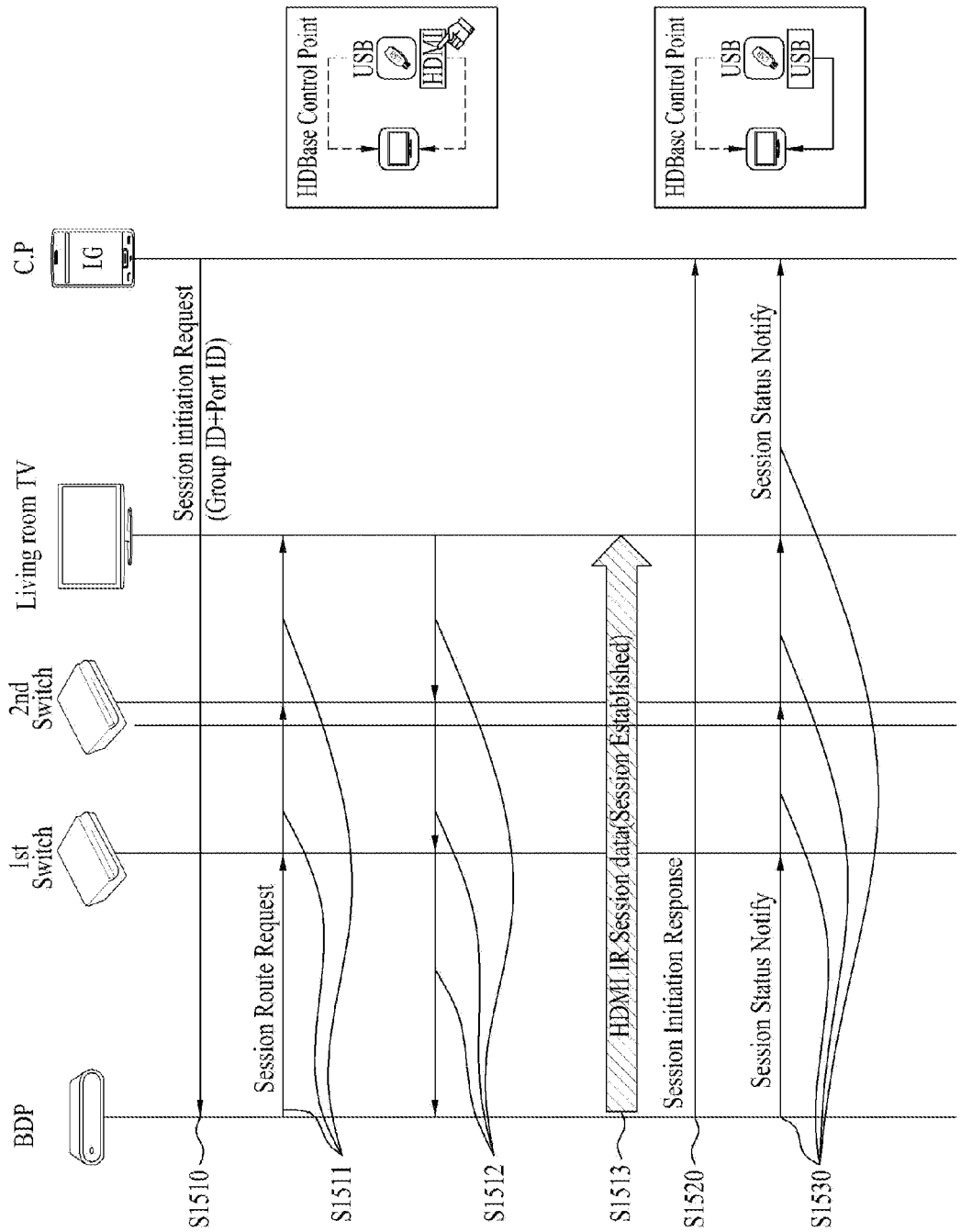
FIG. 15 is a flowchart illustrating another example of various session creating methods according to embodiments of the present invention.

FIG. 15 is a flowchart illustrating another example of various session creating methods according to embodiments of the present invention The session creating process of FIG. 15 is similar to that of FIG. 13. The session creating process of FIG. 15 forms an Interface-to-interface session, whereas the session creating process of FIG. 13 forms a Device-to-Device session.

Accordingly, the session initiation request message including a T-group ID and a port ID may be transmitted as a source provider to the camcorder in step S1510.

Description of the remaining steps S1511 to S1540 of FIG. 15 may refer to steps S1311 to S1340 of FIG. 13.

Figure 16:
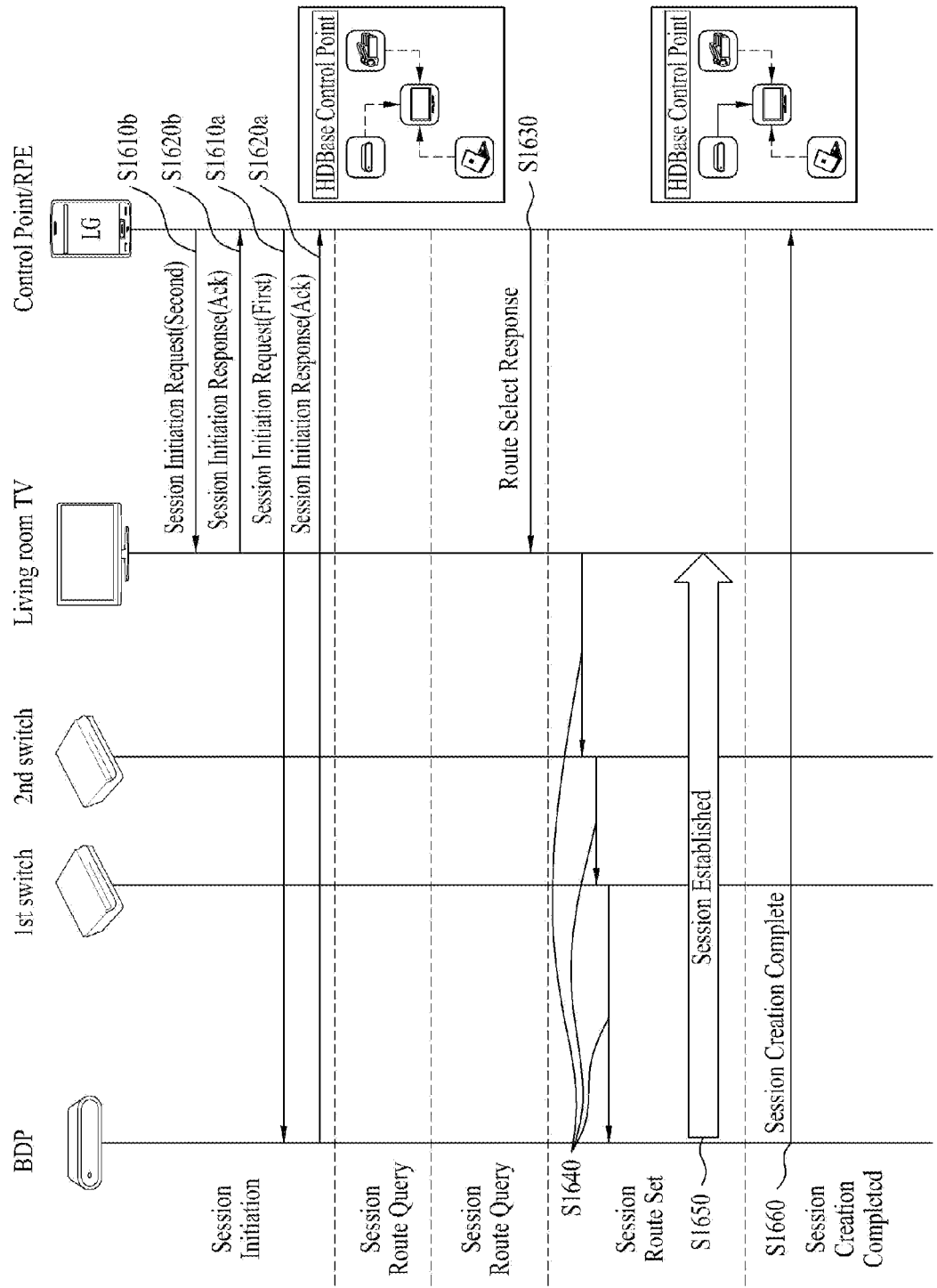
FIG. 16 is a flowchart illustrating another example of various session creating methods according to embodiments of the present invention.

FIG. 16 is a flowchart illustrating another example of various session creating methods according to embodiments of the present invention.

It is assumed that the session creating method of FIG. 16 uses the CRS scheme in the same manner as in FIG. 12. When using the CRS scheme, the RPE has to select a path (i.e., route selection). Accordingly, the CRS scheme need not use the CRS scheme.

In FIG. 16, since the CP has the RPE function, the CP can calculate a Best Route for session initiation and a valid Session ID (SID). The CP may select the Blu-ray Disc Player (BDP) as a first partner, and may select the living nom TV. Accordingly, the CP may sequentially transmit the session initiation request message to the BDP and the living room TV so as to confirm not only the possibility of session initiation of the first partner entity and the second partner entity but also requirements of the session initiation in steps S1610*a* and S1610*b*.

If the BDP and the living room TV can initiate a new session, the BDP and the living room TV can receive a session initiation response message including an acknowledgment (ACK) message in steps S1620*a* and S1620*b*, respectively.

As described above, according to the CRS method, the RPE of the CP can calculate a Best Route, such that the CRS method need not use a Session Route Query (SRQ). Accordingly the CP can transmit information of the selected best route and an SID of a new session to the second partner entity (TV) through a Session Route Select Response (SRSR) message in step S1630.

The living room TV having received the session route selection response message may transmit a Session Route Set message that includes not only information of the best route but also the initiated session ID (SID) to the BDP through the second switch and the first switch in response to the Best Route in step S1640.

The BDP may transmit content to the TV through the newly established session in step S1650.

In order to update information of a new session, the BDP may broadcast a Session Creation Completed message to all the CPs contained in the HDBaseT network. In this case, the Session Creation Completed message may include an SID of a newly created session, the selected PDS, and resource information of the corresponding session in step S1660.

In the embodiments of the present invention, the session initiation request message, the session initiation response message, the session route selection response message, and the session creation completed messages may be transmitted on Ethernet through the HD-CMP message, and the Session Route Query (SRQ) message and the session route Set (SRS) message may be configured in a form of a U_SNPM message on the HDBaseT network.

Figure 17:
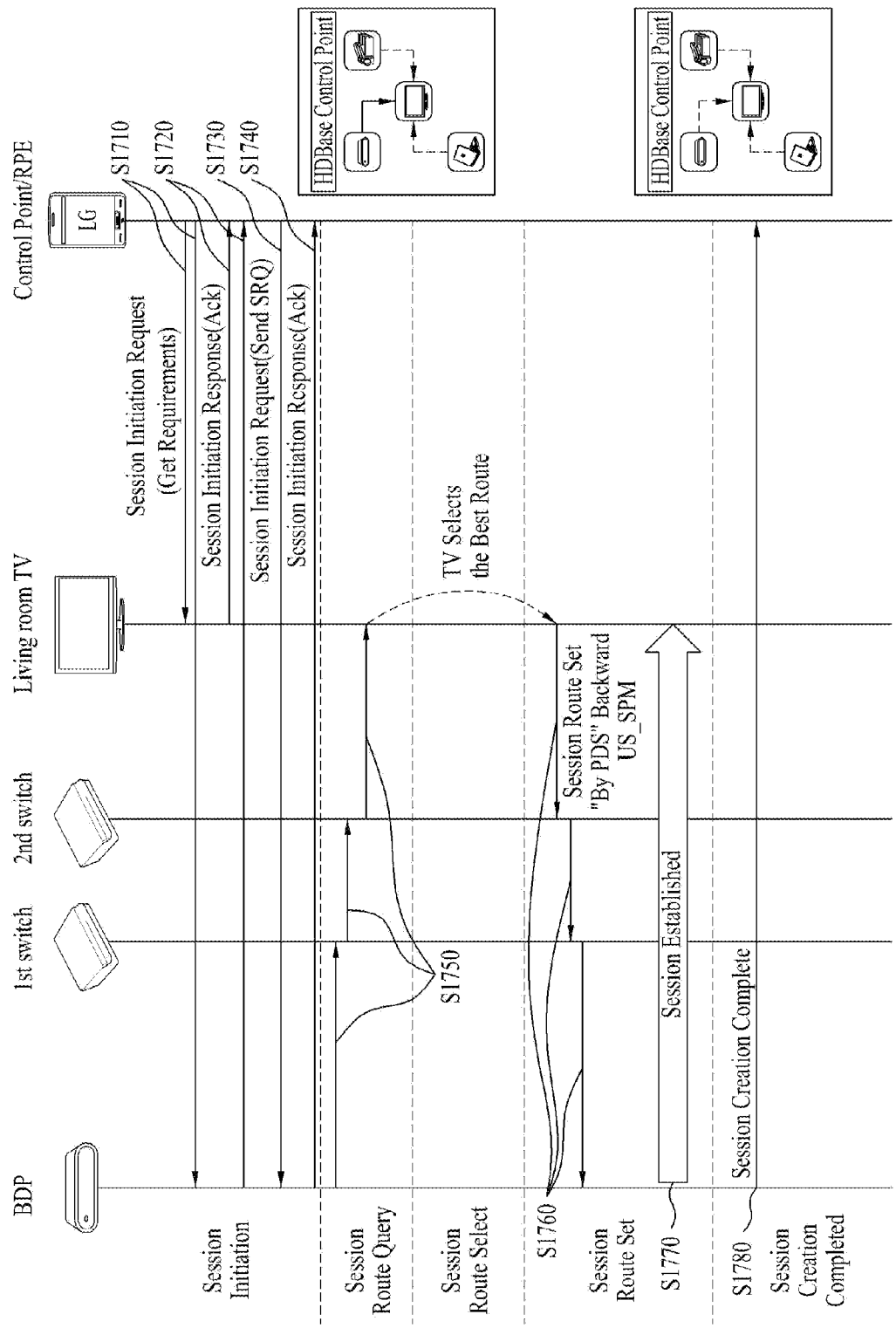
FIG. 17 is a flowchart illustrating another example of various session creating processes according to another embodiment of the present invention.

FIG. 17 is a flowchart illustrating another example of various session creation processes according to another embodiment of the present invention.

FIG. 17 shows a session creation process based on the DRS method shown in FIG. 13. If the user selects the BDP as a source device, the control point (CP) may transmit the session initiation request message so as to create a session connected to the BDP. In this case, the CP may select an HDMI source T-adaptor of the BDP as a first partner, and may select an HDMI sink T-adaptor of the TV as a second partner. The CP may determine whether each HDBaseT device can participate in the session. Then, in order to obtain requirements of the HDBaseT devices, the CP may transmit a session initiation request message to the first partner (BDP) and the second partner (TV) in step S1710.

If the TV and the BDP can participate in the session to be created by the CP, the session initiation response message acting as the ACK message can be transmitted to the CP in step S1720.

The CP having received the session initiation response message transmits the session request message to the BDP acting as the first partner so as to search for the Best Route, and commands the BDP to transmit the session route query (SRQ) message in step S1730.

The BDP having received the session initiation query (SRQ) message for indicating the SRQ may transmit the session initiation response message as an ACK message to the CP in step S1740.

In addition, in order to search for a Best Route, the BDP transmits an SRQ message, that includes not only a Final Destination Entity Reference (FDRE) field indicating a TV acting as the final destination, but also a sink T-group ID field related to an HDMI sink T-adaptor contained in the TV, to the first switch. The first switch transmits the SRQ message to the second switch, and the second switch transmits the SRQ message to the TV acting as the final destination in step S1750.

The TV operating as the second partner entity may select an optimum path (Best Route) as the selection entity. In addition, the TV acting as the second partner entity may transmit the Session Route Set (SRS) message to the BDP through the second switch and the first switch in step S1760.

Through the above-mentioned process, a session is created between the BDP acting as a first partner entity and a TV acting as a second partner entity, and the BDP may transmit HDMI data and the like to the TV through the selected best mute in step S1770.

In order to update information of the new session, the BDP may broadcast a Session Creation Completed message to all the CPs contained in the HDBaseT network. In this case, the session creation completed message may include a newly created Session ID (SID), a selected PDS, and resource information of the corresponding session in step S1780.

In the embodiments of the present invention, the session initiation request message, the session initiation response message, and the session creation completed message may be transmitted to Ethernet through the HD-CMP message, and the Session Route Query (SRQ) message and the Session Route Set (SRS) message may be transmitted using the U_SNPM message format on the HDBaseT network.

Figure 18:
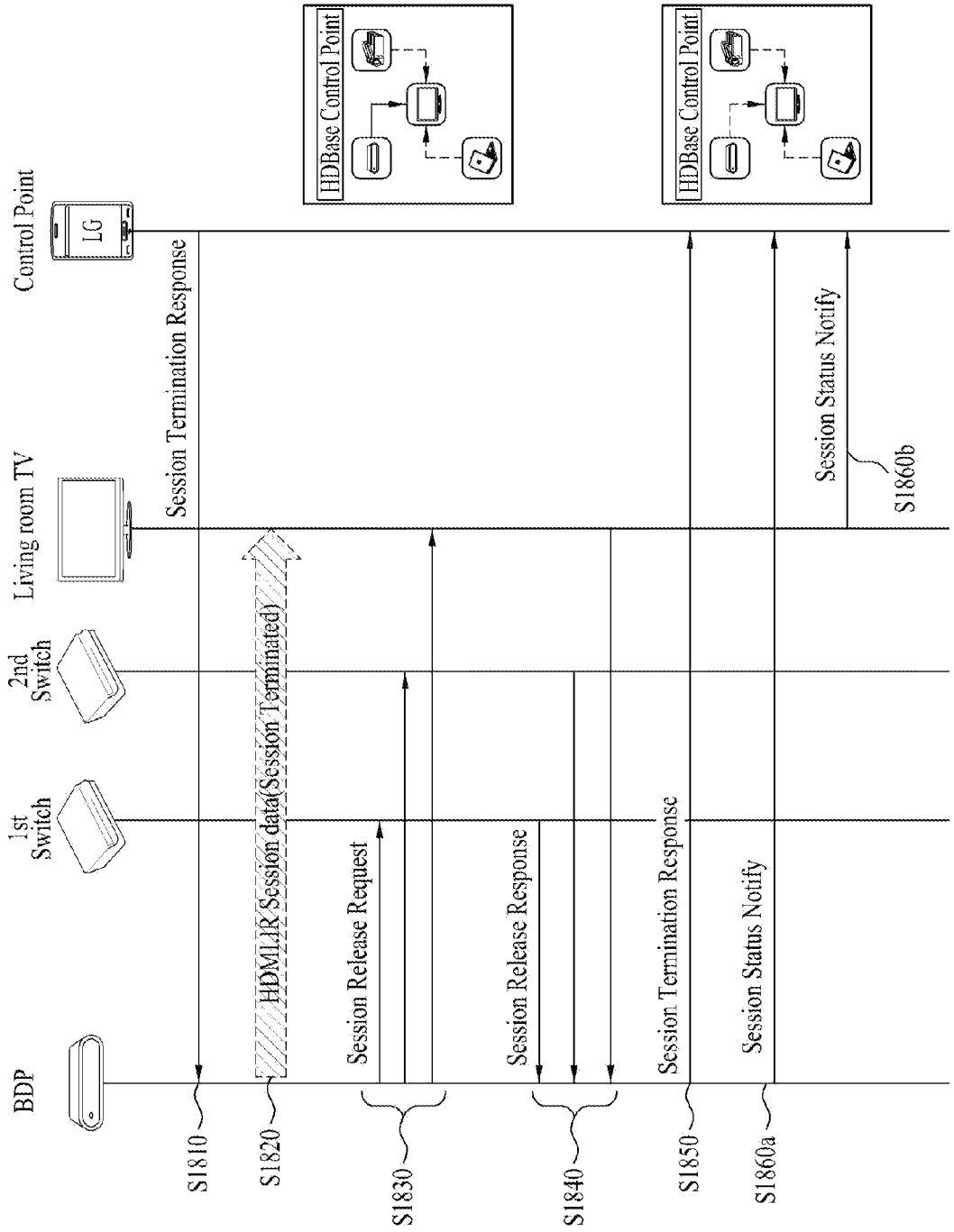
FIG. 18 is a flowchart illustrating an exemplary one of various session termination methods according to one embodiment of the present invention.

FIG. 18 is a flowchart illustrating an exemplary one of various session termination methods according to one embodiment of the present invention.

The session termination method shown in FIG. 18 assumes that the session is terminated using the CRS method in the same manner as in FIG. 12. If a user does not desire to receive content any more, the user may terminate the session.

In this case, the control point (CP) may transmit a Session Termination Request message so as to terminate a session between the BDP and the living room TV in step S1810.

The BDP having received the session termination request message terminates a session connected to the living room TV in step S1820, and may transmit the session release request message to the first switch, the second switch, and the living room TV so as to release a session in step S1830.

Upon receiving the session release request message, the first switch, the second switch, and the living room TV delete information about the created session, and does not transmit and receive data through the corresponding session any longer. In addition, the first switch, the second switch, and the living room TV may transmit the session release response message to the BDP so as to indicate the success of session release in step S1840.

If the session release has been successfully terminated, the BDP may transmit the session termination response message to the CP so as to inform the CP of the session termination in step S1850.

In addition, in order to update information about the session termination, the BDP and the living room TV can transmit the Session Status Notify message including information (e.g. session ID (SID), PDS, session resource information, etc.) of the terminated session to all the CPs contained in the HDBaseT network in steps S1860a and S1860b.

In FIG. 18, description of the session termination request message and the session termination response message may be made to FIG. 10, and description of the session release request message and the session release response message may be made to FIG. 7.

Figure 19:
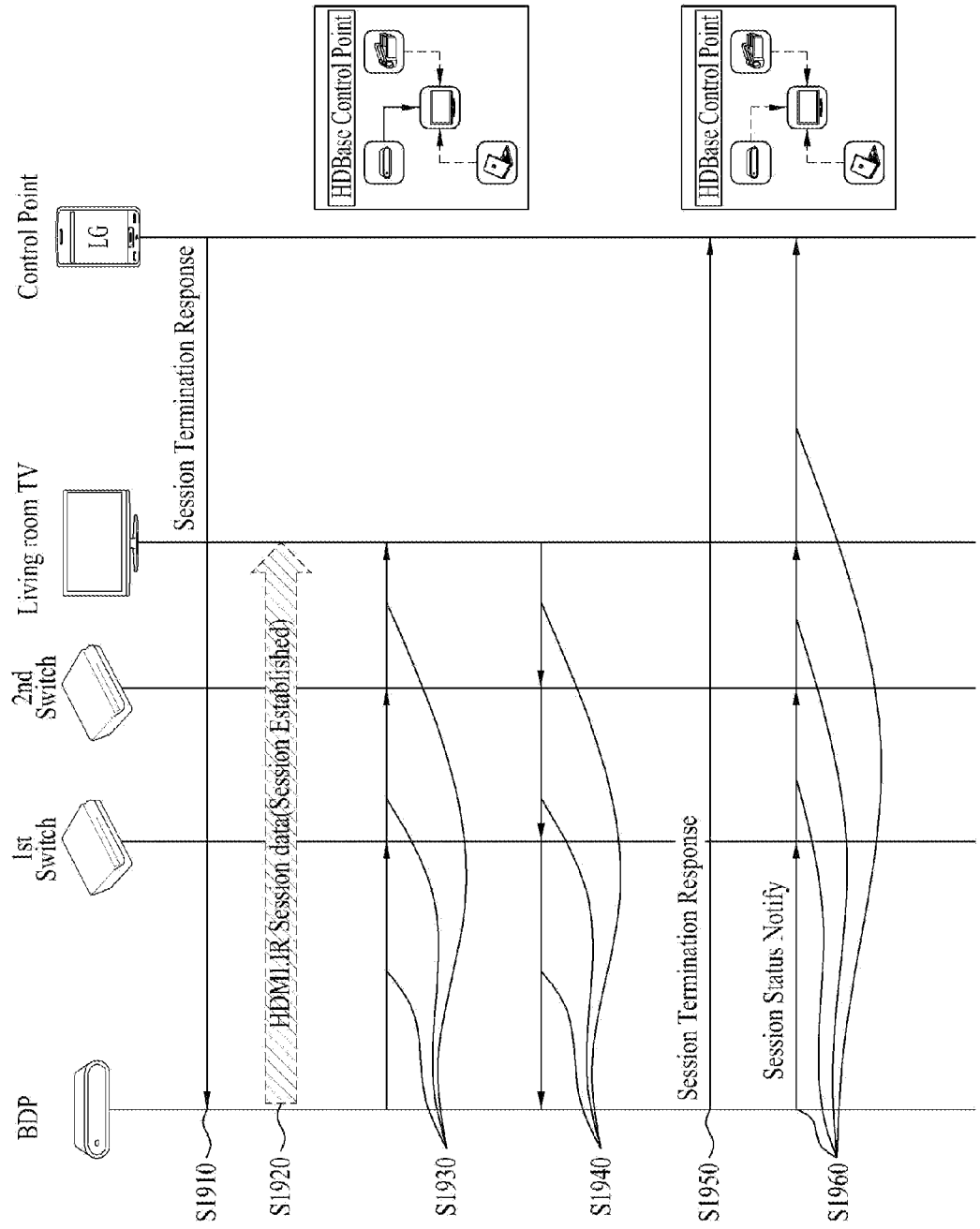
FIG. 19 is a conceptual diagram illustrating an exemplary one of various session termination methods according to one embodiment of the present invention.

FIG. 19 is a conceptual diagram illustrating another example of various session termination methods according to one embodiment of the present invention.

The session termination method of FIG. 19 assumes that the session is terminated using the CRS method. If a user does not desire to receive content any longer, the user may terminate the session. In this case, the control point (CP) entity may transmit a Session Termination Request message to the BDP so as to terminate a session between the BDP acting as a first partner entity and the living room TV acting as a second partner entity in step S1910.

The BDP having received the session termination request message releases a session connected to the living room TV acting as a sink entity releases a session, and may not provide content of the BDP any longer in step S1920.

In addition, after the BDP terminates a session connected to the living room TV, the BDP may transmit the Session Release Request message to the first switch, the second switch, and the living room TV using the DRS scheme so as to release a path established in the session in step S1930.

Upon receiving the session release request message, the first switch, the second switch, and the living room TV recognize that the corresponding session is released and then deletes the corresponding path. Therefore, the living room TV transmits the Session Release Response message to the BDP through the second switch and the first switch, such that it can inform the user of the deletion of the corresponding session path in step S1940.

If the BDP receives the session release response message, it recognizes that the path of the corresponding session is completely deleted, and can transmit the Session Termination Response message to the CP so as to indicate the successful session termination request in step S1950.

In addition, the BDP may transmit the Session Status Notify message to all the CPs contained in the HDBaseT network such that it can inform all the CPs of session release. In this case, the Session Status Notify message may be configured in a form of SNPM and then transmitted to each CP, or may be transmitted to each CP using the broadcast scheme in step S1960.

Description of the session termination request message and the session termination response message may be made to FIG. 10, and description of the session release request message and the session release response message may be made to FIG. 7.

Figure 20:
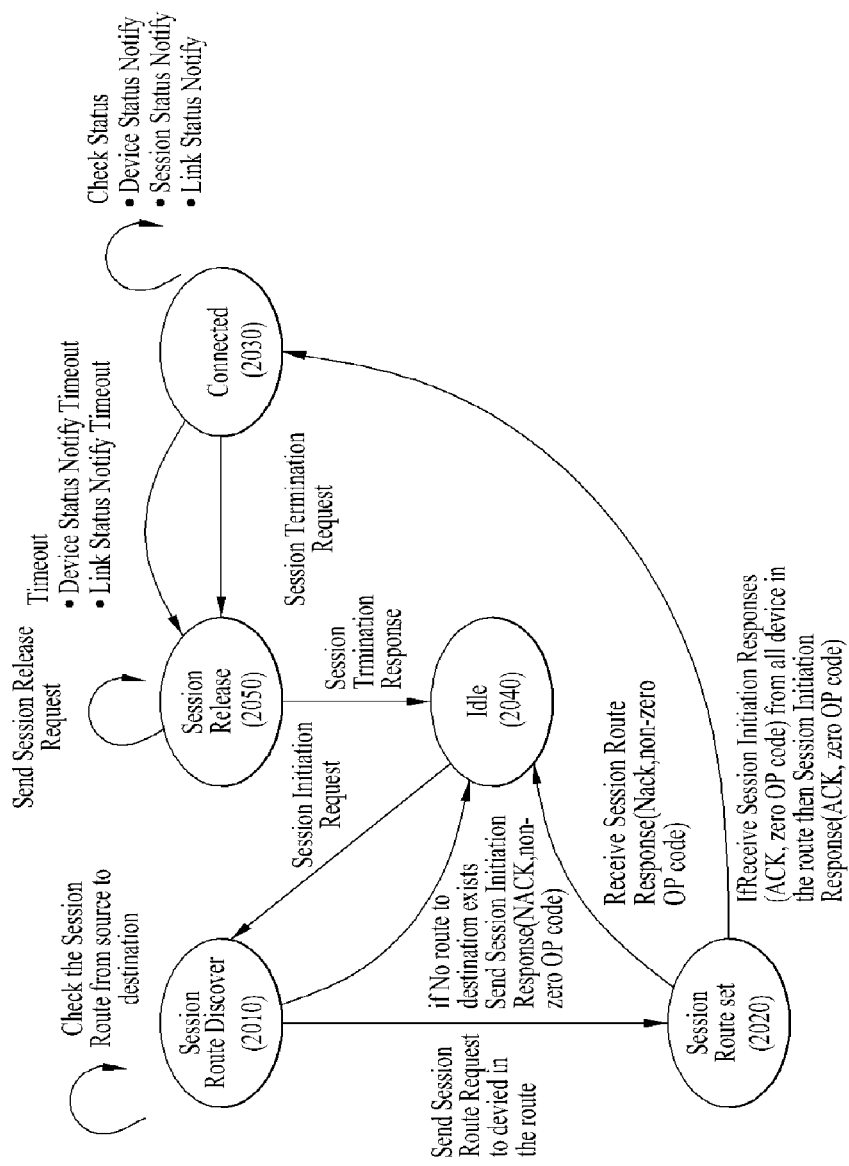
FIG. 20 is a conceptual diagram illustrating a node status for use in a source device according to one embodiment of the present invention.

FIG. 20 is a conceptual diagram illustrating a node status for use in a source device according to one embodiment of the present invention.

In the embodiments of the present invention, the source device is an entity for providing content, and may be any of a BDP, a Camcorder, an XBOX, and a computer. In an idle status 2040, if the source device receives the session initiation request message, the source device is transitioned to a Session Route Discover Status 2010. It is preferable that the source device recognize information about the active session under the HDBaseT environment. Therefore, in the Session Route Discover status 2010, the source device can recognize a session path of the sink device (destination entity) periodically or whenever it receives a request.

In addition, the source device may transmit the session route request message to switches and/or other partner entities so as to search for a path of a new session to be created. Thereafter, the source device enters the Session Route Set status 2020.

Under the Session Route Set status, if the source device receives a session mute response message including ACK information and/or 'zero Op Code' from all devices present in the corresponding route, the source device enters the Connected Status 2030.

In the Session Route Set status 2020, if the source device receives the session route response message including NACK information and/or 'non-zero Op Code', the source device enters the Idle status 2040.

In addition, if a route related to a session to be newly created is not discovered in the Session Route Set status, the source device transmits a session initiation response message including NACK information and/or 'non-Zero Op Code' and re-enters the idle status 2040.

In the Connected Status 2030, the source device transmits the Device Status Notify message, the Session Status Notify message and the Link Status Notify message to control points (CPs).

If the Status Notify status and/or the Link Status Notify status are terminated after a predetermined period of time has elapsed in the Connected Status 2030, the source device enters the Session Release status 2050. In addition, if the source device receives the session termination request message from the CP under the Connected status 2030, it may transition to the session release status 2050.

In the Session Release Status 2050, the source device transmits the session release request message to the switches and/or the sink device. After that, if the source device receives the session release response message from the switches and/or the sink device, the source device enters the idle status 2040.

Figure 21:
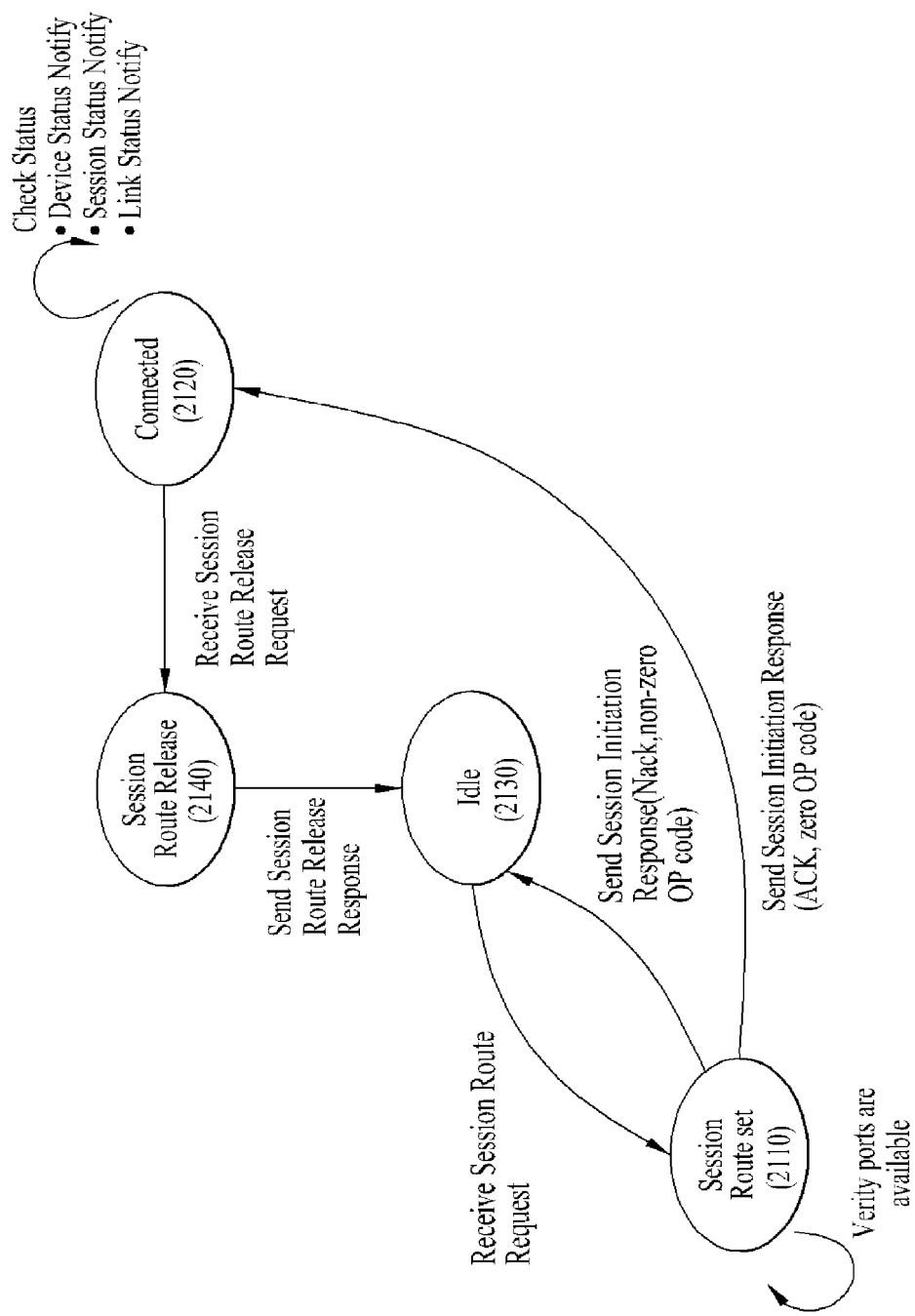
FIG. 21 is a status diagram illustrating a sink device and intermediate nodes according to embodiments of the present invention.

FIG. 21 is a status diagram illustrating a sink device and intermediate nodes according to embodiments of the present invention.

In the embodiments of the present invention, the sink device is an entity for receiving content and providing the received content to the user, and may be any of a TV, a monitor, and other displays. In addition, the intermediate nodes may represent switches for receiving content from the source device and transmitting the received content to the sink device.

The initial status of each of the sink device and the intermediate nodes (hereinafter referred to as 'sink device', etc.) is identical to the idle status 2130. If the sink device receives the session route request message under the idle status 2130, the sink device and the like may enter the Session Route Set status 2110.

In the session route set status 2110, the sink device or the like may confirm its own operable ports. In this case, if the sink device confirms the mute related to a session to be created in the sink device and the like, it transmits the Session Route response message including ACK information and 'zero Op Code' to the source device or the CP, and then enters the connected status 2120.

In the session route set status 2110, if the sink device (or the like) does not confirm the session to be created, the sink device transmits the session route response message including NACK information and/or 'non-zero OP Code' to the source device or the CP, and then enters the idle status 2310.

In the connected status 2120, the sink device (or the like) may transmit the device status notify message, the session status notify message, and/or the link status notify message to the CP or the source node.

If the sink device (or the like) receives the session route release request message under the connected state 2120, the sink device enters the session mute release status 2140. In this case, the sink device (or the like) having received the session route release request message deletes a route related to the created session and information of the session, and transmits the session route release response message to the source device or the CP. Thereafter, the sink device (or the like) enters the idle status 2130.

Messages shown in FIGS. 11 to 21 may use messages shown in FIGS. 6 to 10. In this case, functions of the fields contained in respective messages may be adaptively used according to transmission procedures and transmission purposes of the messages of FIGS. 11 to 21.

Figure 22:
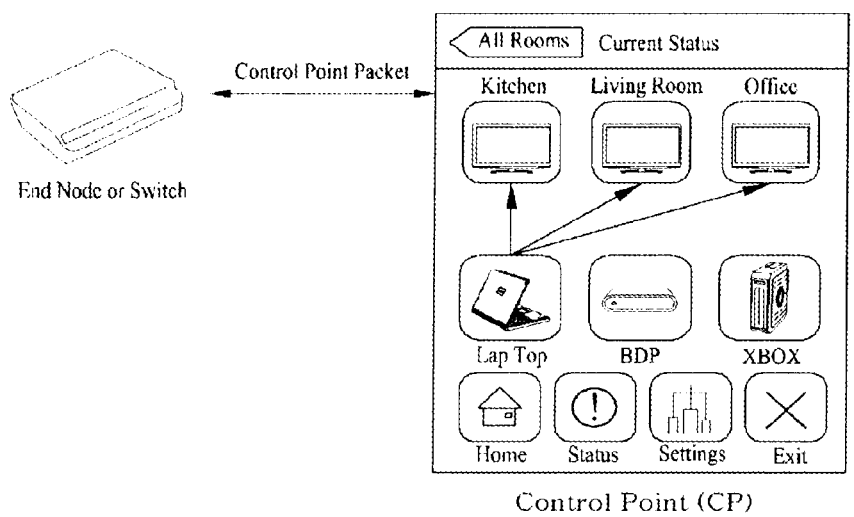
FIG. 22 is a conceptual diagram illustrating an exemplary one of methods for allowing a control point (CP) device to transmit a control message according to embodiments of the present invention.

FIG. 22 is a conceptual diagram illustrating an exemplary one of methods for allowing a control point (CP) device to transmit a control message according to embodiments of the present invention.

The embodiments of the present invention have disclosed various session creation methods and session release methods in order for the HDBaseT devices to transmit/receive specific content.

Detailed methods for session initiation according to the present invention will hereinafter be described with reference to the accompanying drawing.

Referring to FIG. 22, the user may select a Laptop as a source device from the home screen image of the CP, and may select a TV of a kitchen, a TV of the living room, and a monitor of an office as the sink device. In this case, the CP can transmit a variety of control messages to the end node or the switch, such that it can form a session between the source device and the sink device and provide content using the control messages. The control messages can be transmitted through the control point (CP) packet.

In order to form a session, it is preferable that the Device Discover process be first carried out. The Device Discover process may include a status exchange process and a performance exchange process. During the status exchange process, a specific node may broadcast packets indicating a device status and a link status and may confirm the changed status in relation to other nodes. During the performance exchange process, the specific node may request performance information of device- and port-entities from a HDCD of other nodes.

In order to form a video session, a variety of message formats may be used, for example, a Session Connection Request message, a Session Connection Response message, a Video Selection Request message, a Video Selection Response message, a Video Route Request message, a Video Route Response message, a Video Release Update Request message, a Video Release Update Response message, a Routing Table Update message, a Priority Level Request message, a Priority Level Reply message, a Device Lock Update message, a Device Lock Update Reply message, etc.

The above-mentioned messages may include a control point identifier (CP ID) field for identifying a control point (CP) transmitting the above messages; a Destination ID field for identifying an identifier (ID) of a switch, a source device, or a sink device to which the above message is to be transmitted; a Stream ID for identifying a video stream; a Source ID for identifying a source device providing video content; and a Sink ID for identifying a sink device receiving video content.

Figure 23:
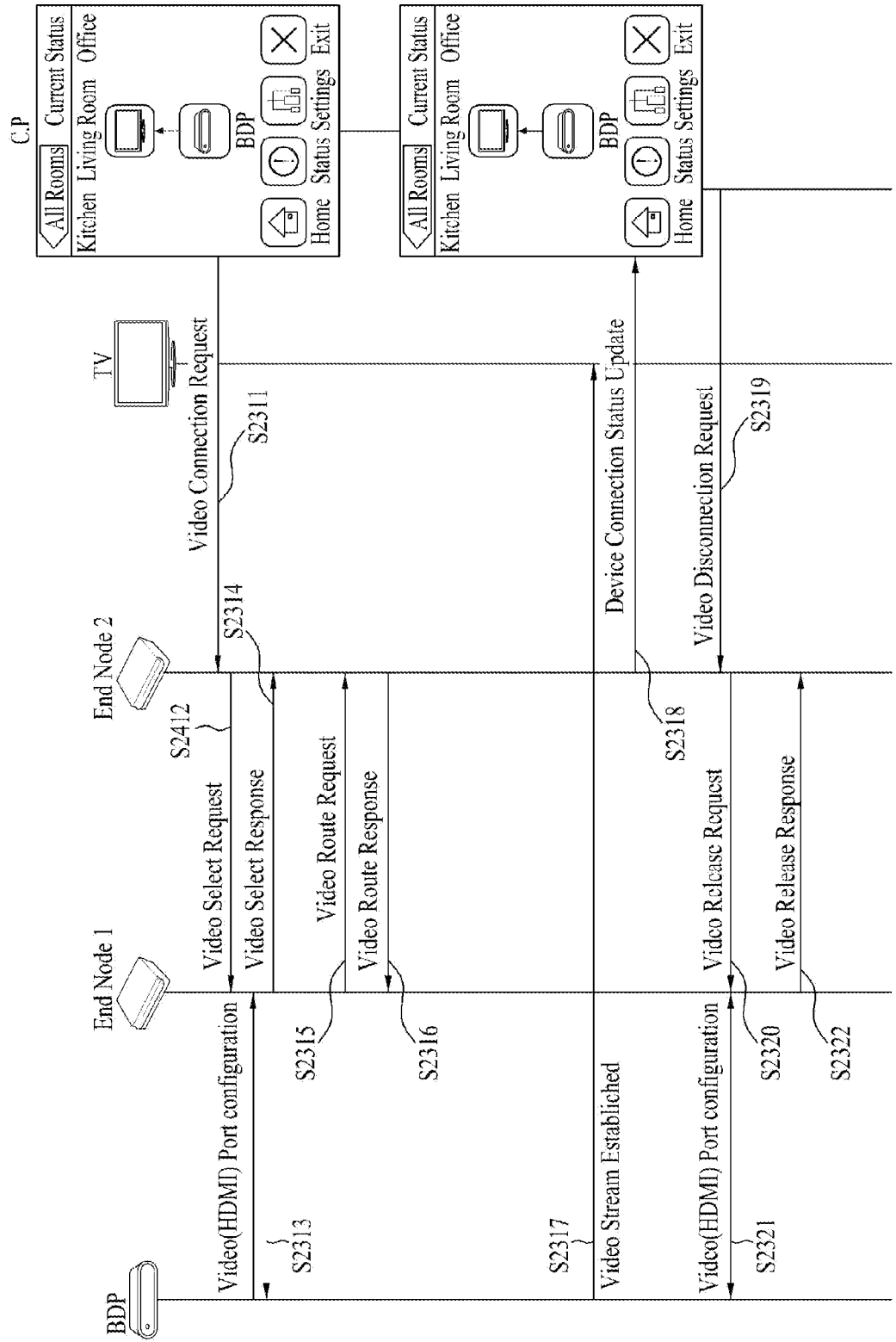
FIG. 23 is a flowchart illustrating an exemplary one of methods for establishing a video route according to one embodiment of the present invention.

FIG. 23 is a flowchart illustrating an exemplary one of methods for establishing a video route according to one embodiment of the present invention.

Referring to FIG. 23, it is assumed that the user selects a BDP as a source device providing content and desires to receive video content through the living room TV. Accordingly, the user selects the BDP as a first partner entity and selects the living room TV as a second partner entity. As a result, the CP transmits a Video Connection Request message for forming a video session between the BDP and the living room TV to the first end node (End Node 1) in step S2311.

End node 1 transmits a Video Select Request message to a second end node (End Node 2), and the End Node 2 carries out a Video Port Configuration process for providing video content in conjunction with the BDP in step S2313.

If the video port is configured, the End Node 2 transmits a Video Select Response message to the End Node 1 in step S2314.

The End Node 1 having received the Video Select Response message can update network topology and calculate a video route. In addition. End Node 1 may transmit a Video Route Set Request message including information of the calculated video path to End Node 2 in step S2315.

End Node 2 confirms available nodes of a DBP and their bandwidths, and transmits a Video Route Response Message including the confirmed information to End Node 1 in step S2316.

End Node 1 may update the routing table and the link status table on the basis of information contained in the Video Route Response message.

As a result, a video route and a video stream are created, and the DBP may provide the created video stream as video content to the living room TV in step S2317.

End Node 2 may transmit the Device Connection Status Update message to the CP so as to update a device connection status in step S2318.

If the user does not want to watch video content any more, or if the corresponding content is completed, the CP may transmit a Video Disconnection Request message to End Node 2 in step S2319.

End Node 2 may transmit video release request messages to End Node 1 in step S2320, and End Node 1 may carry out the Video Port Configuration process to delete a video path of the BDP in step S2321.

If the video route between the BDP and the living room TV is released, End Node 1 may transmit a Video Release Response message indicating the release of video route to End Node 2 in step S2322.

In FIG. 23. End Node 1 and End Node 2 may be contained in a BDP or a TV. In this case, End Node 1 or End Node 2 may be set to the HDBaseT adaptor.

Figure 24:
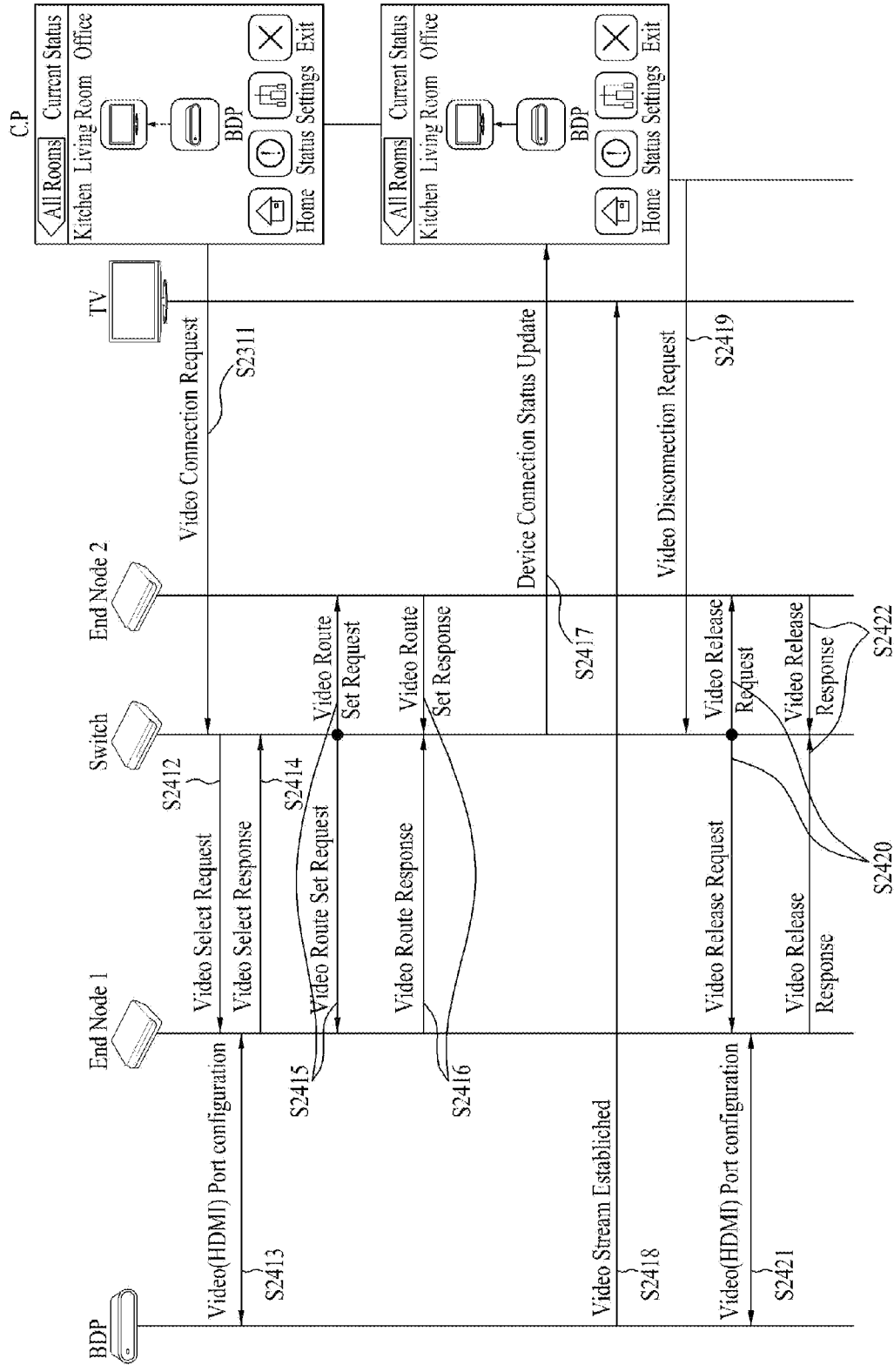
FIG. 24 is a flowchart illustrating another one of methods for establishing a video route according to one embodiment of the present invention.

FIG. 24 is a flowchart illustrating another one of methods for establishing a video route according to one embodiment of the present invention.

Referring to FIG. 24, it is assumed that the user selects a BDP as a source device providing content and desires to receive video content through the living room TV. Accordingly, the user selects the BDP as a first partner entity and selects the living room TV as a second partner entity. As a result, the CP transmits a Video Connection Request message for forming a video session between the BDP and the living room TV to the second end node (End Node 2) in step S2411.

The switch transmits a Video Select Request message to a first end node (End Node 1) in step S2412, and the End Node 1 performs a Video Port Configuration process in conjunction with the BDP in step S2413.

End Node 1 transmits a Video Select Response message to the switch, the switch updates network topology on the basis of information contained in the Video Select Response message, and calculate the best video route in step S2414.

The switch transmits a Video Route Set Request message including information of the calculated best video route to End Node 1 and End Node 2 in step S2415.

In addition, End Node 1 and End Node 2 confirm ports capable of providing the best video route calculated by the switch and bandwidths of the confirmed ports, and may transmit a Video Route Set Response message including the confirmed information to the switch in step S2416.

The switch may update the routing table and the link status table on the basis of the Route Set Response message received from the end nodes. In addition, the switch includes information about the updated routing table and the updated link status table in a Device Connection Status Update message, and transmits the result Device Connection Status Update message to the CP in step S2417.

The BDP may provide video content to the living room TV through the created video route in step S2418.

If the user does not want to view video content any more or if the corresponding content is completed, the CP may transmit a Video Disconnection Request message to the switch in step S2419.

The switch may transmit a Video Release Request message to End Node 1 and End Node 2 in step S2420, and End Node 1 may perform a Video Port Configuration process in conjunction with the BDP so as to delete a video path of the BDP in step S2421.

If the video route between the BDP and the living room TV is released. End Node 1 and End Node 2 may transmit a Video Release Response message indicating the release of video route to the switch in step S2422.

In FIG. 24, End Node 1 and End Node 2 may be contained in a BDP or a TV. In this case, End Node 1 or End Node 2 may be set to the HDBaseT adaptor.

Figure 25:
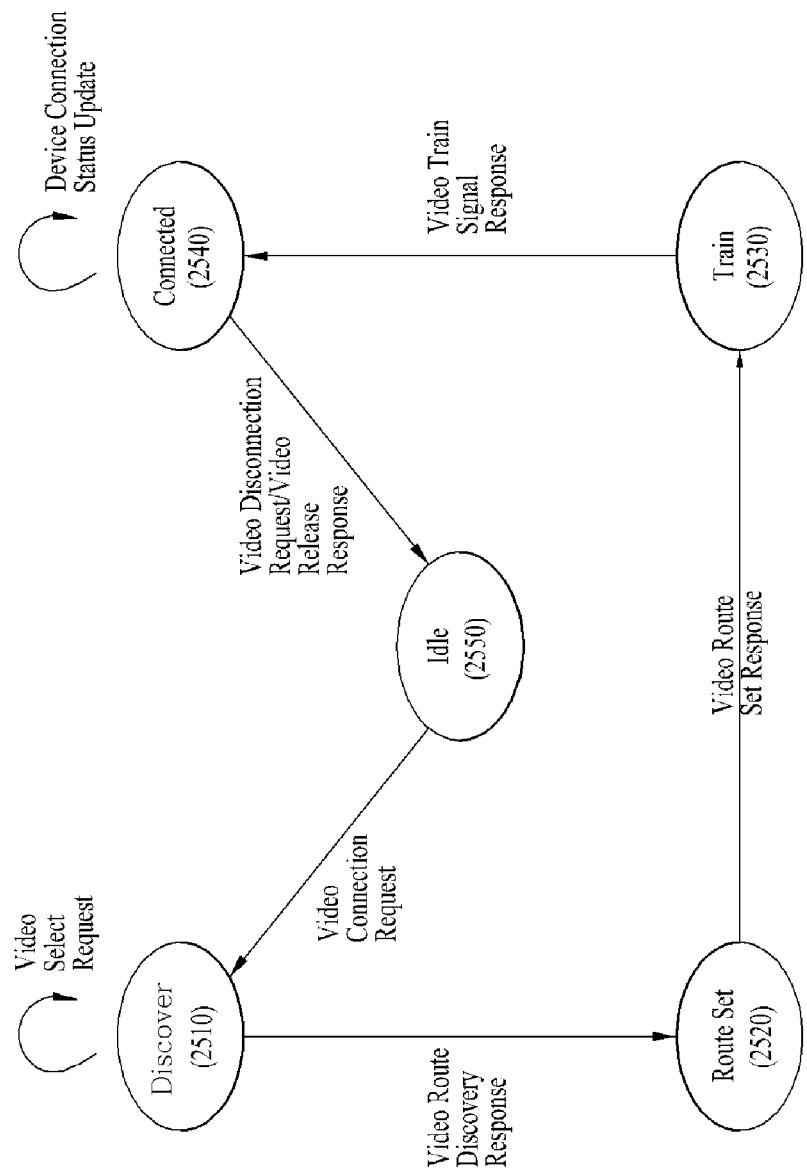
FIG. 25 is a status diagram illustrating an HDBaseT source node on the condition that a video mute is established according to one embodiment of the present invention.

FIG. 25 is a status diagram illustrating an HDBaseT source node on the condition that a video path is established according to one embodiment of the present invention.

Referring to FIG. 25, if the source node receives a Video Connection Request message through the T-adaptor during the idle status 2550, it can transition to the Discover status 2510 for searching for an active session and HDBaseT devices.

In the Discover status 2510, the T-adaptor of the source node may transmit a Video Select Request message so as to establish a video route. Upon receiving the Video Route Discovery Response message, the source node transitions to the Route Set status 2520.

The T-adaptor of the source node transmits the Video Route Set Response message under the Route Set status 2520, and the source node transitions to a Train status 2530.

In the Train status 2530, the source node transmits a Video Train Signal Response message and then transitions to the connected status 2540.

In the connected status 2540, the source node may update a device connection status. If the source node receives a Video Disconnection Request message or the Video Release Response message under the connected status 2540, it transitions to the idle status 2550.

Figure 26:
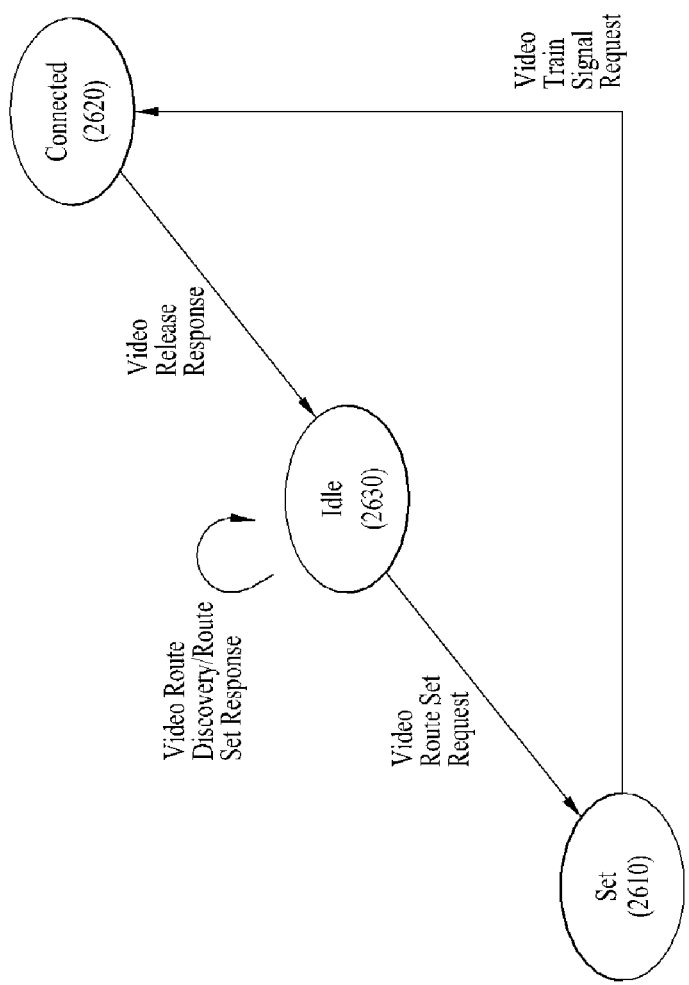
FIG. 26 is a status diagram illustrating an HDBaseT sink node on the condition that a video route is established according to one embodiment of the present invention.

FIG. 26 is a status diagram illustrating an HDBaseT sink node on the condition that a video path is established according to one embodiment of the present invention.

Referring to FIG. 26, the sink node may receive a Video Route Discovery message or a Video Route Set Response message in the idle status 2630. Under the idle status 2630, if the T-adaptor of the sink node receives the Video Route Set Request message, the sink node transitions to the Route Set status 2610.

In the Route Set status 2610, the T-adaptor of the sink node transmits a Video Train Signal Request signal, and the sink node transitions to the connected status 2620 such that it can receive video content.

In the connected status 2620, if the sink node receives a Video Release Request message, it can delete a video route for receiving video content and then transmit a Video Release Response message. After that, the sink node transitions to the idle status 2630.

Figure 27:
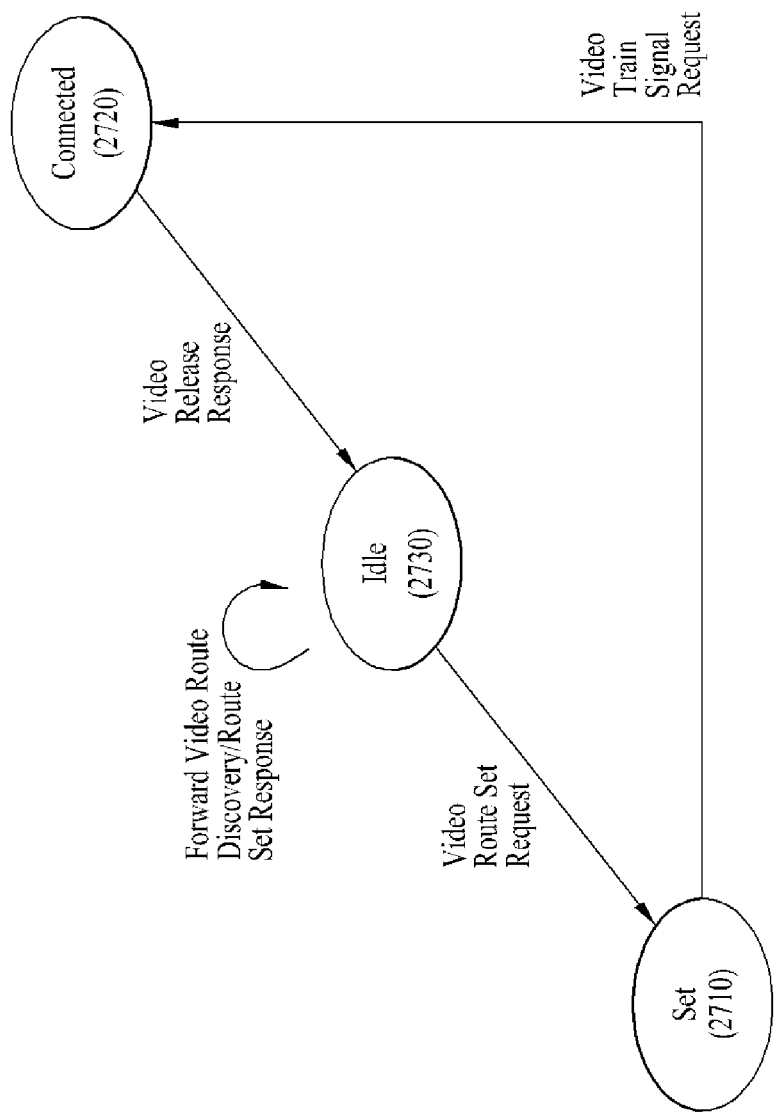
FIG. 27 is a status diagram illustrating an HDBaseT intermediate node on the condition that a video route is established according to one embodiment of the present invention.

FIG. 27 is a status diagram illustrating an HDBaseT intermediate node on the condition that a video path is established according to one embodiment of the present invention.

An HDBaseT Intermediate Node is present between the source node and the sink node. For example, a switch or the like may be used as the HDBaseT intermediate node.

In the idle status 2730, the intermediate node may transmit the Video Route Discovery message or may receive the Route Set Response message. In addition, the intermediate node transmits the Video Route Set Request message and enters the Route Set status 2710.

In the Route Set status 2710, the intermediate node may transmit a Video Train Signal Request message and may request video content through a video route. Thereafter, the intermediate node transitions to the connected status 2720.

In the connected status 2720, the intermediate node transmits a Video Release Response message, releases the established video route, and finally enters the idle status 2730.

In the embodiments of the present invention, the source device and the sink device may include a transmission (Tx) module for transmitting data and a reception (Rx) module for receiving data on the Ethernet network. In addition, each of the source device and the sink device may include a processor that supports the operation of initiating, forming, managing, and terminating a session, and the processor may control methods shown in FIGS. 11 to 27. In addition, the source device and the sink device may include at least one of management entities, for example, a PDME, an SDME and/or a CPME, and may also include one or more T-adaptors and one or more ports.

In the embodiments of the present invention, the control point (CP) may be contained in an end node, a switch, or Ethernet devices. In addition, the CP may include an RPE function. For example, a Mobile Station (MS), a Mobile Terminal (MT), a User Equipment (UE), and/or a smartphone may be used as such an Ethernet device. The end node may be a T-adaptor. Each Ethernet device may include a processor for supporting the above-mentioned methods, a Tx module for transmitting Ethernet data, and a Rx module for receiving Ethernet data. In the embodiments of the present invention, Ethernet devices each including the CP may be generically named a CP for convenience of description and better understanding of the present invention.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

It will be apparent to those skilled in the art that various modifications and variations can be made to the present invention without departing from the spirit or scope of the invention. Therefore, the above-mentioned detailed description must be considered only for illustrative purposes instead of restrictive purposes. The scope of the present invention must be decided based upon a rational analysis of the claims, and all modifications within the equivalent range of the present invention are within the scope of the present invention.

INDUSTRIAL APPLICABILITY

The embodiments of the present invention are applicable to various home networks and home entertainment industries. In particular, the embodiments of the present invention can be applied to the HDBaseT system.

The invention claimed is:

1. A method for initiating a session over a High Definition Base T (HDBaseT) network, the method comprising:
    receiving, at a session partner, a request message requesting an initiation of a session from an initiation apparatus over an Ethernet network; and
    transmitting, by the session partner, a response message in response to the request message to the initiation apparatus over the Ethernet network,
    wherein the request message includes a first source entity reference field for identifying the initiation apparatus and a first destination entity reference field for identifying the session partner,
    wherein the first source entity reference field includes a Medium Access Control (MAC) address for identifying a management entity contained in the initiation apparatus and a HDBaseT group port identifier (TPG ID) for identifying a port of the initiation apparatus, and
    wherein the first destination entity reference field includes a Medium Access Control (MAC) address for identifying a management entity contained in the session partner and a HDBaseT group port identifier (TPG ID) for identifying a port of the session partner.

2. The method according to claim 1, wherein the response message includes a second destination entity reference field for identifying the initiation apparatus and a second source entity reference field for identifying the session partner.

3. The method according to claim 2, wherein the second source entity reference field includes a Medium Access Control (MAC) address for identifying a management entity contained in the session partner and a HDbaseT group port identifier (TPG ID) for identifying a port of the session partner, and
    the second destination entity reference field includes a Medium Access Control (MAC) address for identifying a management entity contained in the initiation apparatus and a group port identifier (TPG ID) for identifying a port of the initiation apparatus.

4. The method according to claim 1, wherein the request message includes a source identifier (ID) field, a source T-group ID field, a source T-adaptor mask field, a sink ID field, a sink T-group ID field, and a sink T-adaptor mask field,
    the source ID field, the source T-group ID field, and the source T-adaptor mask field are indicative of a T-adaptor of a current session partner, and
    the sink ID field, the sink T-group ID field, and the sink T-adaptor mask field are indicative of a T-adaptor of a T-adaptor of another session partner.

5. The method according to claim 1, wherein the session partner includes a source device for providing content through the session and a sink device for receiving the content through the session.

6. The method according to claim 1, wherein the request message and the response message are transmitted using a HDBaseT Control and Management Protocol (HD-CMP) message format.

7. The method according to claim 1, wherein the initiation apparatus is a mobile station (MS) including a control point (CP), and
    the session partner is a source device for providing content.

8. A session partner apparatus for initiating a session over a High Definition Base T (HDBaseT) network, the session partner apparatus comprising:
    a transmission (Tx) module for transmitting a message;
    a reception (Rx) module for receiving a message; and
    a management entity configured to initiate the session over the HDbaseT network by controlling the Tx module and the Rx module,
    wherein the management entity is configured to receive a request message requesting an initiation of a session from an initiation apparatus using the Tx module over an Ethernet network, and transmit a response message in response to the request message to the initiation apparatus over the Ethernet network by using the Rx module, and
    wherein the request message includes a first source entity reference field for identifying the initiation apparatus and a first destination entity reference field for identifying the session partner,
    wherein the first entity source reference field includes a Medium Access Control (MAC) address for identifying the management entity and a HDBaseT group port identifier (TPG ID) for identifying a port of the initiation apparatus, and wherein the first destination entity reference field includes a Medium Access Control (MAC) address for identifying a management entity contained in the session partner and a HDBaseT group port identifier (TPG ID) for identifying a port of the session partner.

9. The session partner apparatus according to claim 8, wherein the response message includes a second destination entity reference field for identifying the initiation apparatus and a second source entity reference field for identifying the session partner.

10. The session partner apparatus according to claim 9, wherein:

the second source entity reference field includes a Medium Access Control (MAC) address for identifying a management entity contained in the session partner and a HDBaseT group port identifier (TPG ID) for identifying a port of the session partner, and the second destination entity reference field includes a Medium Access Control (MAC) address for identifying the management entity of the initiation apparatus and a group port identifier (TPG ID) for identifying a port of the initiation apparatus.

11. The session partner apparatus according to claim 8, wherein the request message includes a source identifier (ID) field, a source T-group ID field, a source T-adaptor mask field, a sink ID field, a sink T-group ID field, and a sink T-adaptor mask field, the source ID field, the source T-group ID field, and the source T-adaptor mask field are indicative of a T-adaptor of a current session partner, and the sink ID field, the sink T-group ID field, and the sink T-adaptor mask field are indicative of a T-adaptor of a T-adaptor of another session partner.

12. The session partner apparatus according to claim 8, wherein the session partner includes a source device for providing content through the session and a sink device for receiving the content through the session.

13. The session partner apparatus according to claim 8, wherein the request message and the response message are transmitted using a HDBaseT Control and Management Protocol (HD-CMP) message format.

14. The session partner apparatus according to claim 8, wherein the initiation apparatus is a mobile station (MS) including a control point (CP), and the session partner is a source device for providing content.

* * * * *